(12) United States Patent
Kojima et al.

(10) Patent No.: US 7,810,919 B2
(45) Date of Patent: Oct. 12, 2010

(54) RECORDING INK, INK CARTRIDGE, INK RECORD, INKJET RECORDING APPARATUS, AND INKJET RECORDING METHOD

(75) Inventors: Mariko Kojima, Komae (JP); Tomohiro Inoue, Yokohama (JP); Akihiko Gotoh, Atsugi (JP); Michihiko Namba, Yokohama (JP); Hisashi Habashi, Isehara (JP); Akiko Bannai, Ohta (JP); Kiyofumi Nagai, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 230 days.

(21) Appl. No.: 11/575,444

(22) PCT Filed: Sep. 16, 2005

(86) PCT No.: PCT/JP2005/017542

§ 371 (c)(1),
(2), (4) Date: May 22, 2008

(87) PCT Pub. No.: WO2006/030978

PCT Pub. Date: Mar. 23, 2006

(65) Prior Publication Data

US 2008/0248260 A1    Oct. 9, 2008

(30) Foreign Application Priority Data

Sep. 17, 2004  (JP) ............................. 2004-272236
Mar. 8, 2005   (JP) ............................. 2005-064371

(51) Int. Cl.
*G01D 11/00* (2006.01)

(52) U.S. Cl. .................... 347/100; 523/160; 106/31.13; 106/31.6

(58) Field of Classification Search ........... 347/95–100; 106/31.13, 31.27, 31.6; 523/160
See application file for complete search history.

(56) References Cited

U.S. PATENT DOCUMENTS 5,840,806 A * 11/1998 Komazaki et al. ........... 525/101

(Continued)

FOREIGN PATENT DOCUMENTS

JP    5 25354    2/1993

(Continued)

OTHER PUBLICATIONS

U.S. Appl. No. 11/575,169, filed Mar. 13, 2007, Namba et al.

(Continued)

*Primary Examiner*—Matthew Luu
*Assistant Examiner*—Rut Patel
(74) *Attorney, Agent, or Firm*—Oblon, Spivak, McClelland, Maier & Neustadt, L.L.P.

(57) ABSTRACT

The object of the invention to provide a recording ink with excellent discharge stability and storage stability, which rapidly penetrates into a recording medium and forms a coating, and which will never generate smearing upon high-speed printing or double-sided printing, and which excels in marker resistance, and which enables high quality image recording with less bleeding, and the ink cartridge, the ink record, the inkjet recording apparatus, and the inkjet recording method using the recording ink. The recording ink containing at least water, a colorant, a resin fine-particle, a water-soluble organic solvent and a penetrant, in which the penetrant is a diol compound whose carbon number is 7 to 11 and the resin fine-particle is a silicone modified acrylic resin not containing a hydrolyzable silyl group.

15 Claims, 6 Drawing Sheets

U.S. PATENT DOCUMENTS

| | | | | |
|---|---|---|---|---|
| 5,905,109 A | * | 5/1999 | Shimizu et al. | 524/506 |
| 6,180,690 B1 | * | 1/2001 | Spinelli | 523/160 |
| 6,417,249 B1 | * | 7/2002 | Nguyen et al. | 523/201 |
| 6,426,375 B1 | * | 7/2002 | Kubota | 523/160 |
| 2003/0019395 A1 | * | 1/2003 | Ma et al. | 106/31.59 |
| 2003/0038869 A1 | * | 2/2003 | Kaneko et al. | 347/100 |
| 2003/0196569 A1 | | 10/2003 | Yatake et al. | |
| 2004/0176497 A1 | | 9/2004 | Segawa et al. | |
| 2005/0007433 A1 | * | 1/2005 | Inoue et al. | 347/100 |

FOREIGN PATENT DOCUMENTS

| | | |
|---|---|---|
| JP | 6 157861 | 6/1994 |
| JP | 7 278480 | 10/1995 |
| JP | 9 176533 | 7/1997 |
| JP | 3011087 | 12/1999 |
| JP | 2000 144030 | 5/2000 |
| JP | 2002 256187 | 9/2002 |
| JP | 2002 294105 | 10/2002 |
| JP | 2003 226827 | 8/2003 |
| JP | 2003 313480 | 11/2003 |
| JP | 2004-162043 | 6/2004 |
| JP | 2004 338392 | 12/2004 |
| WO | WO 99/23183 | 5/1999 |
| WO | WO 01/51018 A2 | 7/2001 |

OTHER PUBLICATIONS

U.S. Appl. No. 12/094,235, filed May 19, 2008, Namba et al.

* cited by examiner

RECORDING INK, INK CARTRIDGE, INK RECORD, INKJET RECORDING APPARATUS, AND INKJET RECORDING METHOD

TECHNICAL FIELD

The present invention relates to a recording ink and an ink cartridge, ink record, an inkjet recording apparatus, and an inkjet recording method using the recording ink.

BACKGROUND ART

Dyes have conventionally been used as a colorant of ink for inkjet recording. However, dye ink has the deficiency that it has less water resistant properties and less atmospheric corrosion resistance, so it easily blots on plain paper. In order to overcome these defects, pigment ink where pigment is used as a colorant has been proposed. Even though this pigment ink has excellent water resistant properties and atmospheric corrosion resistance and enables recording of images with less bleeding, there is the problem that it has less fixation.

Therefore, the improvement of the fixation by adding various resins has been attempted. For example, a method to record images with less bleeding by adding thermoplastic resin emulsion to pigment ink is proposed (refer to Patent Literature 1). However, in this proposal, because drying by heating is performed, there is the deficiency that the apparatus becomes complex and that there is more consumption of electricity.

Further, an ink composition where an acrylic silicone resin fine-particle containing an alkoxysilyl group is used (refer to Patent Literature 2) and a coating agent composed of reactivity resin emulsion having a hydrolyzable silyl group and an amine imide group (refer to Patent Literature 3) are proposed. However, these proposals do not take the improvement of fixation and storage properties into consideration, making them unsuitable for practical use.

Further, Patent Literature 4 proposes a method where the emulsion copolymerization of a vinyl monomer having a specific reactive silyl group, which exists in the form of a salt, another vinyl monomer having a reactive silyl group other than that mentioned above, and other vinyl monomer copolymerizable with these monomers results in the production of polymer emulsion while the hydrolyzable silyl group exists stably.

However, in this proposal, there is the deficiency that the resin fine-particle where the hydrolyzable silyl group remains reacts with the ink, and causes a decrease of the long-term storage properties of the ink.

Further, Patent Literature 5 proposes a recording liquid where emulsion resin, which is formed by the radical polymerization of an ethylene unsaturated monomer in the presence of a radical reactivity emulsion, and pigment is dispersed in a aqueous medium. However, with this proposal, there is no disclosure or suggestion regarding whether or not an alkoxysilyl group remains in the emulsion resin, and even though a left standing test for a dispersion of the emulsion resin, glycerin and water was conducted, since composition containing the emulsion resin, glycerin and water has high surface tension, it has less permeability to a recording medium. In addition, ink containing a resin component tends to have less permeability because the ink is easily accumulated on a recording medium after printing. If high-speed printing or high-speed double side printing is performed using ink with inferior permeability, there is the problem that a roller for the purpose of conveying a recording medium rubs the printed portion immediately after printing, and smearing occurs.

Further, Patent Literature 6 proposes a method where a polymeric monomer is emulsion-polymerized and an organosiloxane compound is absorbed into the obtained polymer particles and condensation occurs. In this proposal, the particles themselves form a film with excellent tolerance. However, in the ink containing the pigment, in order to fix the pigment and to add excellent abrasion resistance and marker resistance, it becomes necessary to add a large quantity of resin fine-particle. However, with ink containing a large quantity of resin, there is the problem that the ink dries out in the vicinity of a nozzle, which discharges the ink when printing, with the easy occurrence of droplet bend or no discharge.

Therefore, recording ink with excellent discharge stability and storage stability, which rapidly penetrates into a recording medium and forms a coating, and which will never generate smearing upon high-speed printing or double-sided printing, and which excels in marker resistance, and which enables high quality image recording with less bleeding, has not been provided yet, so the actual situation is that the prompt development of ink is desired.

Patent Literature 1 Japanese Patent Application Laid-Open (JP-A) No. 9-176533
Patent Literature 2 Japanese Patent (JP-B) No. 3011087
Patent Literature 3 Japanese Patent Application Laid-Open (JP-A) No. 5-25354
Patent Literature 4 Japanese Patent Application Laid-Open (JP-A) No. 6-157861
Patent Literature 5 Japanese Patent Application Laid-Open (JP-A) No. 2002-294105
Patent Literature 6 Japanese Patent Application Laid-Open (JP-A) No. 7-278480

DISCLOSURE OF INVENTION

The objective of the present invention is to provide recording ink with excellent discharge stability and storage stability, which rapidly penetrates into a recording medium and forms a film, and which generates no smear upon high-speed printing or double-sided printing, and which excels in marker resistance, and which enables high quality image recording with less bleeding; and to provide an ink cartridge, an ink record, an inkjet recording apparatus and an inkjet recording method using the recording ink.

As a result of diligently repeating examinations by the inventors of the present application for the purpose of resolving the above-mentioned problems; in the recording ink containing at least water, a colorant, resin fine-particle and a penetrant, in order to improve abrasion resistance and marker resistance, it has been discovered that silicone modified acrylic resin not containing any hydrolyzable silyl group is the most suitable for a resin that can form a strong film after penetrating into a recording medium and setting the colorant.

Further, it has been discovered that even if containing a resin component, using a diol compound having carbon number of 7 to 11 results in realizing an ink where the permeability into the recording medium is excellent, high picture density is maintained, and no image bleeding occurs.

The recording ink of the present invention comprising at least water, a colorant, resin fine-particle, a water-soluble organic solvent and a penetrant; the penetrant is a diol compound having carbon number of 7 to 11; and the resin fine-particle is a silicone modified acrylic resin not containing a hydrolyzable silyl group.

In this aspect, the recording ink of the present invention, in which the volume average particle diameter is 10 nm to 300 nm; the silicon (Si) quantity originated from the silicone modified acrylic resin in the recording ink is 50 ppm to 400 ppm; the minimum film forming temperature (MFT) of the resin fine-particle is 20° C. or lower; the water-soluble organic solvent is at least one selected from glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone and N-hydroxyethyl-2-pyrrolidone; the colorant is at least one of a pigment, a dye and a colored fine-particle; the pigment has at least one hydrophilic group on the surface, and is at least one of water dispersible and water soluble in the absence of a dispersant; 0.05 parts by mass to 1.2 parts by mass of the silicone modified acrylic resin fine-particles not containing a hydrolyzable silyl group is added relative to 1 part by mass of pigment; a nonionic surfactant is comprised, and the nonionic surfactant is at least one selected from an acetylene glycol surfactant, polyoxyethylene alkyl ether, polyoxyethylene alkylphenyl ether, polyoxyethylene alkyl ester and polyoxyethylene sorbitan fatty acid ester; a fluorochemical surfactant is comprised, and the fluorochemical surfactant is at least one selected from the following Structural Formulae (1), (2) and (3); an anionic surfactant is comprised, and the anionic surfactant is comprised and the anionic surfactant is at least one selected from polyoxyethylene alkyl ether acetate and dialkyl sulfosuccinate salt; an aminopropane diol compound is further comprised; the viscosity of the recording ink at 25° C. is 7 mPa·sec. to 20 mPa·sec.; the solid content of the recording ink is 6% by mass to 20% by mass; at least one selected from cyan ink, magenta ink, yellow ink and black ink.

Structural Formula (1)

in the Structural Formula (1), 'm' is an integer of 0 to 10, and 'n' is an integer of 1 to 40.

Structural Formula (2)

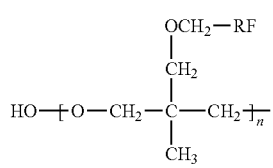

in the Structural Formula (2), 'Rf' is $CF_3$ or $CF_2CF_3$, 'm' is an integer of 6 to 25, 'n' is an integer of 1 to 4, and 'p' is an integer of 1 to 4.

Structural Formula (3)

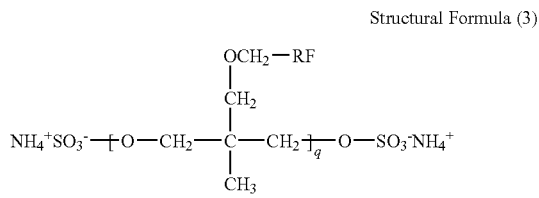

in the Structural Formula (3), 'Rf' is $CF_3$ or $CF_2CF_3$, and 'q' is an integer of 1 to 6.

The ink cartridge of the present invention comprises a container containing the recording ink, and the recording ink is the recording ink of the present invention.

The inkjet recording apparatus of the present invention has at least an ink drops discharging unit configured to discharge a recording ink drops to form an image by applying an impulse to the recording ink, and the recording ink is the recording ink of the present invention.

In this aspect, the impulse is at least one selected from heat, pressure, vibration and light; the inkjet recording apparatus has a reversing unit configured to reverse a recording surface of the recording medium so as to enable double-sided printing; the inkjet recording apparatus has an endless conveying belt, and a conveying unit configured to convey a recording medium by electrifying the surface of the endless conveying belt; the inkjet recording apparatus comprising a subtank for supplying the ink onto a recording head, and the ink is supplied from the ink cartridge to the subtank via a supply tube are preferable.

The inkjet recording method of the present invention comprises at least a recording ink drop discharging step of discharging an ink drops to form an image by applying the impulse to the recording ink, and the recording ink is the recording ink of the present invention.

The ink record of the present invention has an image formed onto a recording medium by using the recording ink, and the recording ink is the recording ink of the present invention.

BEST MODE FOR CARRYING OUT THE INVENTION

Recording Ink

Figure 1:
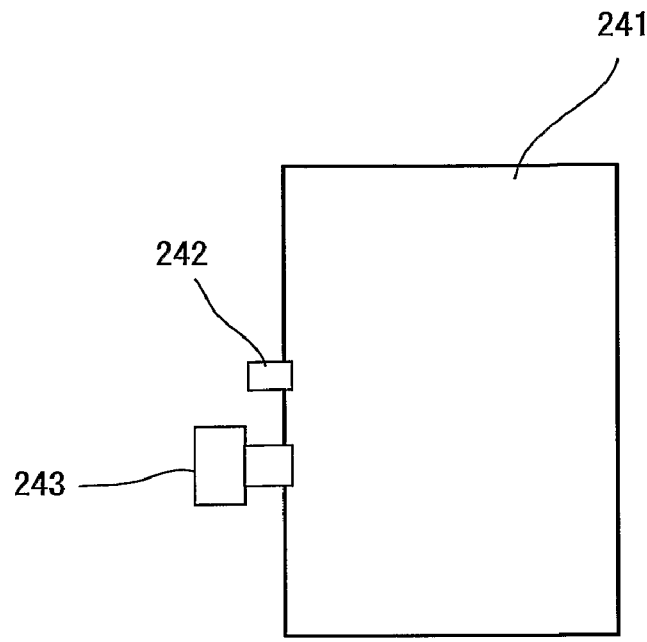
FIG. 1 is a schematic view showing an example of the ink cartridge of the present invention.

The recording ink of the present invention contains at least water, a colorant, resin fine-particle, a water-soluble organic solvent and a penetrant. The penetrant is a diol compound the carbon number of which is 7 to 11. The resin fine-particle is composed of silicone modified acrylic resin not containing a hydrolyzable silyl group; and a surfactant, an aminopropanediol compound and other component(s) are composed, where necessary.

As the resin fine-particle, use is made of a silicone modified acrylic resin not containing a hydrolyzable silyl group, which can be obtained by polymerizing an acrylic monomer and a silane compound in the presence of an emulsifier.

As the polymerization, for example, radical polymerization, emulsion polymerization, dispersion polymerization, seed polymerization and suspension polymerization are provided.

Examples of the acrylic monomer are not particularly limited and may be selected appropriately according to the purpose. Examples thereof include acrylic ester monomers such as methyl acrylate, ethyl acrylate, butyl acrylate, 2-ethylhexyl acrylate, 2-hydroxyethyl acrylate, acryloyl morpholine, and N,N'-dimethylaminoethylacrylate; methacrylic ester monomers such as methyl methacrylate, ethyl methacrylate, butyl methacrylate, 2-ethylhexyl methacrylate, 2-hydroxyethyl methacrylate, N,N'-dimethylaminoethyl methacrylate; amide acrylates such as N-methylolacrylamide and methoxymethylacrylamide; carboxylic acid-containing monomers such as maleic acid, fumaric acid, itaconic acid, acrylic acid, methacrylic acid, and the like.

The emulsifier is not particularly limited and may be appropriately selected according to the purpose. Examples of the emulsifier include alkylbenzenesulfonic acid and their salt, dialkylsulfosuccinic ester and their salt, alkylnaphthalenesulfonic acid and their salt, alkylnaphthalenesulfonic acid salt formalin condensates, higher fatty acid salt, higher fatty acid ester sulfonic acid salt, ethylenediamine polyoxypropylene-polyoxyethylene condensates, sorbitan fatty acid ester and their salt, aromatic and aliphatic phosphoric acid ester and their salt, dodecylbenzene sulfonate, dodecylsulfate, laurylsulfate, dialkylsulfosuccinate, polyoxyethylene alkylphenylethersulfate, polyoxyethynealkylpropenylphenylethersulfate, alkylphenyletherdisulfonate, polyoxyethylenealkylphosphate, polyoxyethylenealkyletheracetate, polyoxyethylenelanoline alcohol ether, polyoxyethylenelanoline fatty acid ester, laurylalcohol ethoxylate, lauryl ether sulfuric ester salt, lauryletherphosphoric acid ester, sorbitan fatty acid ester, fatty acid diethanolamide, naphthalenesulfonic acid formalin condensates, and the like. Examples of these salts include sodium, ammonium, and the like.

Reactive emulsifiers having an unsaturated double bond can be used as the emulsifier. Examples of the reactive emulsifier include commercially available Adekalia soap SE, NE, PP (by Asahi Denka), LATEMUL S-180 (by Kao), ELEMINOL JS-2, ELEMINOL RS-30 (by Sanyo Kasei), and Aquaron RN-20 (by Dai-ichi Kogyo Seiyaku).

The silane compound is not particularly limited and may be appropriately selected according to the purpose. Examples of the silane compound include tetramethoxysilane, methyltrimethoxysilane, dimethyldimethoxysilane, phenyltrimethoxysilane, diphenyldimethoxysilane, tetraethoxysilane, methyltriethoxysilane, dimethyldiethoxysilane, phenyltriethoxysilane, diphenyldiethoxysilane, hexyltrimethoxysilane, hexyltrimethoxysilane, decyltrimethoxysilane, decyltrimethoxysilane, trifluoropropyltrimethoxysilane, and the like.

Monomers generally known as silane coupling agents may be used as the silane compound, examples of which monomers include vinyltrichlorosilane, vinyltrimethoxysilane, vinyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2(aminoethyl) 3-aminopropylmethyldimethoxysilane, N-2(aminoethyl) 3-aminopropyltrimethoxysilane, N-2(aminoethyl) 3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloric acid salt, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanate propyltriethoxysilane, and the like.

The hydrolyzable silyl group in the silicone modified acrylic resin not containing a hydrolyzable silyl group refers to a silyl group containing a hydrolyzable group. Examples of the hydrolyzable group include alkoxy, mercapto, halogen, amide, acetoxy, amino, isopropenoxy groups, and the like.

As the hydrolyzable silyl group, for example, a halogenosilyl group, an acyloxysilyl group, an amidesilyl group, an aminoxysilyl group, an alkenyloxysilyl group, an aminosilyl group, an oximesilyl group, an alkoxysilyl group and a thio alkoxysilyl group are provided.

The silyl group is hydrolyzed and becomes a silanol group, which is dehydrated and condensed, and a siloxane bond generated.

In the present invention, the hydrolyzable silyl group in the silicone modified acrylic resin is hydrolyzed via the polymerization reaction and disappears, so there is no hydrolyzable silyl group in the silicone modified acrylic resin. If the hydrolyzable silyl group remains, when it is used in making the recording ink, the storage properties may deteriorate.

For confirming the non-usage of the hydrolyzable silyl group in the silicone modified acrylic resin, a peak of $^{29}$Si—NMR of the raw material and a peak of $^{29}$Si—NMR in a sample are compared to determine whether or not the peak in the hydrolyzable silyl group has disappeared.

The resin fine-particles preferably have a volume average particle diameter of 10 nm to 300 nm, more preferably 40 nm to 200 nm. When the volume average particle diameter is smaller than 10 nm, the resin emulsion has a higher viscosity. Therefore, it is sometimes difficult to obtain an ink viscosity dischargeable in an inkjet printer. When the average particle diameter is larger than 300 nm, the printer nozzle may clog with the particles, causing discharge malfunction.

For the addition of the silicone modified acrylic resin fine-particle not containing the hydrolyzable silyl group, it is preferable to add 0.05 parts by mass to 1.2 parts by mass of silicone modified acrylic resin fine-particles not containing a hydrolyzable silyl group to 1 part by mass of pigment, and it is more preferable to add 0.2 parts by mass to 1.0 parts by mass of the pigment. If the silicone modified acrylic resin fine-particles is less than 0.05 parts by mass, sufficient fixation may not be obtained, and if it is more than 1.2 parts by mass, sufficient image density may not be obtained.

Further, for the silicon (Si) quantity originating from the silicone modified acrylic resin in the recording ink, 100 ppm to 400 ppm is preferable, and 100 ppm to 300 ppm is more preferable. If the silicon amount is less than 50 ppm, a coating with excellent abrasion properties and marker resistance may not be obtained, and if it is more than 400 ppm, the tendency of hydrophobicity becomes greater and the stability in the aqueous ink may deteriorate.

Here, the silicon (Si) quantity in the recording ink can be measured, for example, using a high-frequency induction plasma emission spectrometer.

For the minimum film forming temperature (MFT) of the silicone modified acrylic resin not containing the hydrolyzable silyl group, 20° C. or less is preferable, and 0° C. or less is more preferable. If the minimum film forming temperature is more than 20° C., sufficient fixation may not be obtained, and when the printed portion is rubbed or traced with a marker pen, the pigment is removed and the recording medium may be smeared.

Here, the minimum film forming temperature (MFT) can be measured, for example, using a film formation temperature meter.

—Penetrant—

As the penetrant, use is mad of a diol compound the carbon number of which is 7 to 11. If the carbon number is less than 7, because sufficient permeability cannot be obtained, a recording medium may be smeared with double-sided printing, or because the spread of the ink on the recording medium is insufficient and pixel filling becomes worse, the reduction of letter quality or image density may occur. If the carbon number is more than 11, the storage stability may deteriorate.

As the diol compound, for example, 2-ethyl-1,3-hexanediol or 2,2,4-trimethyl-1,3-pentanediol is suitable.

For the addition of the diol compound, 0.1% by mass to 20% by mass is preferable, and 0.5% by mass to 10% by mass is more preferable. If the addition is too small, the permeability of the ink to the paper deteriorates, and smearing may occur due to rubbing by a roller upon conveyance, or when reversing a recording surface of the recording medium for double-sided printing, and ink may become stuck to a conveying belt and smearing may occur, so it may be unresponsive to high-speed or double-sided printing. In the meantime, if the addition is excessive, the printing dot diameter becomes larger, and the line width of letters may become wider or the image definition may deteriorate.

—Colorant—

The colorant may be any one of pigments, dyes, and coloring fine-particles.

An aqueous dispersion of polymer fine-particles containing coloring materials is preferably used as the coloring fine-particles.

Here, the aforementioned "containing coloring materials" means either one or both of the state that coloring materials are sealed in polymer fine-particles and the state that coloring materials are adsorbed to the surface of polymer fine-particles. All coloring materials mixed in the recording ink of the present invention are not necessarily sealed in or adhered to polymer fine-particles. The coloring materials may be dispersed in the emulsion as long as the efficacy of the present invention is not impaired. The coloring materials are not particularly limited and may be appropriately selected according to the purpose as long as they are insoluble or hardly soluble in water and can be adhered to the polymer.

Here, the aforementioned "insoluble or hardly soluble in water" means that 10 parts by mass or more of coloring materials are not dissolved in 100 parts by mass of water at 20° C. Further, "soluble" means that separated or precipitated coloring materials are not visible at the surface or bottom of an aqueous solution.

The average particle diameter of the polymer fine-particles containing coloring materials (coloring fine-particles) in the ink is preferably 0.16 μm or smaller.

The content of the coloring fine-particles in the recording ink is, by solid content, preferably 8% by mass to 20% by mass, more preferably 8% by mass to 12% by mass.

The colorant may be dyes, such as water-soluble, oil-soluble, and disperse dyes, and pigments, and the like. Oil-soluble and disperse dyes are preferable in view of excellent adsorption and sealable properties. However, pigments are preferably used in view of light stability of obtained images.

The dyes are preferably dissolved in an organic solvent such as a ketone solvent at a rate of 2 g/L or higher, more preferably at a rate of 20 g/L to 600 g/L, in view of efficient impregnation into polymer fine-particles.

Water-soluble dye may be those classified as acidic, direct, basic, reactive, and food dyes in the color index and preferably has excellent water resistance and light stability.

Examples of the acidic and food dyes include C.I. Acid Yellow 17, 23, 42, 44, 79, 142; C.I. Acid Red 1, 8, 13, 14, 18, 26, 27, 35, 37, 42, 52, 82, 87, 89, 92, 97, 106, 111, 114, 115, 134, 186, 249, 254, 289; C.I. Acid Blue 9, 29, 45, 92, 249; C.I. Acid Black 1, 2, 7, 24, 26, 94; C.I. Food Yellow 3, 4; C.I. Food Red 7, 9, 14; C.I. Food Black 1, 2, and the like.

Examples of the Direct dye include C.I. Direct Yellow 1, 12, 24, 26, 33, 44, 50, 86, 120, 132, 142, 144; C.I. Direct Red 1, 4, 9, 13, 17, 20, 28, 31, 39, 80, 81, 83, 89, 225, 227; C.I. Direct Orange 26, 29, 62, 102; C.I. Direct Blue 1, 2, 6, 15, 22, 25, 71, 76, 79, 86, 87, 90, 98, 163, 165, 199, 202; C.I. Direct Black 19, 22, 32, 38, 51, 56, 71, 74, 75, 77, 154, 168, 171, and the like.

Examples of the Basic dye include C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; C.I. Basic Black 2, 8, and the like.

Examples of the reactive dye include C.I. Reactive Black 3, 4, 7, 11, 12, 17; C.I. Reactive Yellow 1, 5, 11, 13, 14, 20, 21, 22, 25, 40, 47, 51, 55, 65, 67; C.I. Reactive Red 1, 14, 17, 25, 26, 32, 37, 44, 46, 55, 60, 66, 74, 79, 96, 97; C.I. Reactive Blue 1, 2, 7, 14, 15, 23, 32, 35, 38, 41, 63, 80, 95, and the like.

The pigments are not particularly limited and may be appropriately selected according to the purpose. The pigments may be, for example, either inorganic or organic.

Examples of the inorganic pigments include titanium oxide, iron oxide, calcium carbonate, barium sulfate, aluminum hydroxide, barium yellow, cadmium red, chrome yellow, carbon black, and the like. Among them, carbon black is preferable. Examples of the carbon black include those produced by known methods such as contact, furnace, thermal methods, and the like.

Examples of the organic pigments include azo pigments, polycyclic pigments, dye chelates, nitro pigments, nitroso pigments, aniline black, and the like. Among them, azo pigments and polycyclic pigments are preferable. Examples of the azo pigments include azo lake, insoluble azo pigments, condensed azo pigments, chelate azo pigments, and the like. Examples of the polycyclic pigments include phthalocyanine pigments, perylene pigments, perynone pigments, anthraquinone pigments, quinacridone pigments, dioxane pigments, indigo pigments, thioindigo pigments, isoindolinone pigments, quinofuraron pigments, and the like. Examples of the dye chelates include basic dye chelates, acidic dye chelates, and the like.

The pigments are not particularly limited in color and may be appropriately selected according to the purpose. For example, is black or color pigments can be used. They may be used individually or in combination of two or more.

Examples of the black pigments include carbon blacks (C.I. Pigment Black 7), such as furnace black, lampblack, acetylene black, and channel black, metals such as copper, iron (C.I. Pigment Black 11), and titanium oxide, organic pigments such as aniline black (C.I. Pigment Black 1), and the like.

Among the color pigments, examples of yellow pigments include C.I. Pigment Yellow 1 (fast yellow G), 3, 12 (disazo yellow AAA), 13, 14, 17, 23, 24, 34, 35, 37, 42 (yellow iron oxide), 53, 55, 74, 81, 83 (disazo yellow HR), 95, 97, 98, 100, 101, 104, 108, 109, 110, 117, 120, 128, 138, 150, and 153, and the like.

Examples of magenta pigments include C.I. Pigment Red 1, 2, 3, 5, 17, 22 (brilliant fast scarlet), 23, 31, 38, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 92, 101 (colcothar), 104, 105, 106, 108 (cadmium red), 112, 114, 122 (dimethylquinacridone), 123, 146, 149, 166, 168, 170, 172, 177, 178, 179, 185, 190, 193, 209, 219, and the like.

Examples of cyan pigments include C.I. Pigment Blue 1, 2, 15 (copper phthalocyanine blue R), 15:1, 15:2, 15:3 (phthalocyanine blue G), 15:4, 15:6 (phthalocyanine blue E), 16, 17:1, 56, 60, 63, and the like.

Examples of intermediate color, red, green, and blue, pigments include C.I. Pigment Red 177, 194, 224, C.I. Pigment Orange 43, C.I. Pigment Violet 3, 19, 23, 37, C.I. Pigment Green 7, 36, and the like.

Among the pigments, self-dispersible color pigments that have at least one hydrophilic group bound to the pigment surface directly or via another atomic group and are stably dispersed in the absence of dispersant are preferably used. Consequently, a dispersant for dispersing the pigments, which is required in the prior art ink, is unnecessary. Among the self-dispersible color pigments, ionic self-dispersible color pigments are preferable. Anionic or cationic self-dispersible color pigments are preferable.

Examples of the anionic hydrophilic group include —COOM, —SO$_3$M, —PO$_3$HM, —PO$_3$M$_2$, —SO$_2$NH$_2$, and —SO$_2$NHCOR (in which M is a hydrogen atom, alkali metal, ammonium, or organic ammonium; R is an alkyl group having 1 to 12 carbon atoms, a phenyl group that may have a substituent, or a naphthyl group that may have a substituent). Among them, color pigments having —COOM or —SO$_3$M bound to the surface are preferably used.

Examples of the alkali metal "M" in the hydrophilic group include lithium, sodium, potassium, and the like. Examples of the organic ammonium include mono- or tri-methylammonium, mono- or tri-ethylammonium, and mono- or tri-methanolammonium. Among the anionic color pigments, a color pigment having —COONa bound to the surface may be obtained for example by oxidizing a color pigment with sodium hypochlorite, sulfonating, or reacting diazonium salt.

The cationic hydrophilic groups are, for example, preferably quaternary ammonium groups, more preferably the following quaternary ammonium groups. The pigments having any of these bound to the surface are preferable color materials.

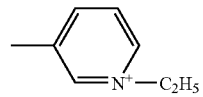

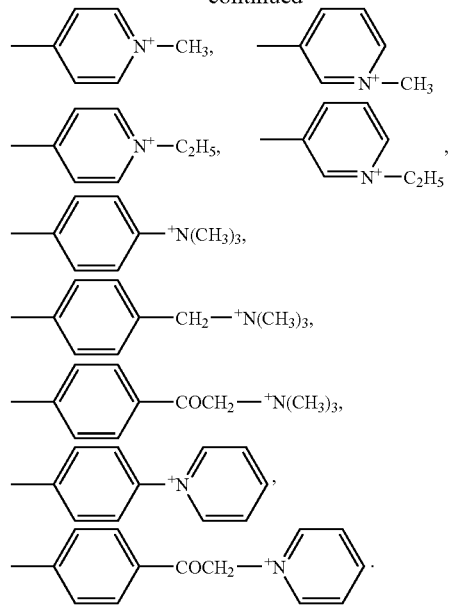

The cationic self-dispersible carbon black having a hydrophilic group may be obtained for example by treating carbon black with 3-amino-N-ethylpyridium bromide to bind an N-ethylpyridyl group having the following Structural Formula. Needless to say, the present invention is not limited thereto.

The hydrophilic group may be bound to the carbon black surface via another atomic group in the present invention. Examples of the atomic group include an alkyl group having 1 to 12 carbon atoms, a phenyl group that may have a substituent, or a naphthyl group that may have a substituent. Examples of the hydrophilic group bound to the carbon black surface via another atomic group include —C$_2$H$_4$COOM (in which M is an alkali metal or a quaternary ammonium), -PhSO$_3$M (in which Ph is a phenyl group; and M is an alkali metal or a quaternary ammonium), and —C$_5$H$_{10}$NH$_3$+. Needless to say, the present invention is not limited thereto.

Pigment dispersion using a pigment dispersant may be used in the present invention.

Examples of natural pigment dispersants among the pigment dispersant as the hydrophilic polymers include plant polymers such as arabic gum, tragacanth gum, guar gum, karaya gum, locust bean gum, arabinogalactone, pectin, and quinceseed starch, seaweed polymers such as alginic acid, carrageenan, and agar, animal polymers such as gelatin, casein, albumin, and collagen, and microorganism polymers such as xanthein gum and dextran. Examples of semi-synthetic pigment dispersant include fibrous polymers such as methylcellulose, ethylcellulose, hydroxyethylcellulose, hydroxypropylcellulose, and carboxymethylcellulose, starch polymers such as sodium carboxymethyl starch and sodium phosphate ester starch, and seaweed polymers such as sodium alginate, propylene glycol alginate ester, and the like. Examples of pure synthetic pigment dispersant include vinyl polymers such as polyvinyl alcohol, polyvinylpyrrolidone, and polyvinylethyl ether, uncrosslinked polyacrylamide, polyacrylic acid and alkali metal salts thereof, acrylic resin such as water-soluble styreneacrylic resin, water-soluble styrenemaleic acid resin, water-soluble vinylnaphthaleneacrylic resin, water-soluble vinylnaphthalenemaleic resin, polyvinylpyrrolidone, polyvinyl alcohol, alkali metal salt of β-naphthalenesulfonic acid formarine condensate, polymers having a salt of a cationic functional group such as a quaternary ammonium and an amino group on the side chain, and natural polymer compounds such as shellac. Among them, those having a carboxylic acid group such as homopolymers of acrylic acid, methacrylic acid, and styreneacrylic acid and copolymers of monomers having other hydrophilic groups are particularly preferable polymer dispersants.

These copolymers preferably have a mass average molecular mass of 3,000 to 50,000, more preferably 5,000 to 30,000, and further preferably 7,000 to 15,000.

The mixture rate by mass of pigment to dispersant is preferably 1:0.06 to 1:3, more preferably 1:0.125 to 1:3.

The addition rate of pigments as the colorant in the recording ink is preferably 4% by mass to 15% by mass, more preferably 5% by mass to 12% by mass. Generally, the image concentration is increased and a higher image quality is obtained as the pigment concentration is increased. On the other hand, adverse effects on fixing properties and reliability including stable discharge and clogging easily appear. However, the present invention ensures the fixing properties while maintaining the reliability including stable discharge and clogging even when the pigment addition rate is increased.

—Water-Soluble Organic Solvent—

The water-soluble organic solvents are not limited and may be appropriately selected according to the purpose. Examples of the water-soluble organic solvent include polyvalent alcohols such as ethylene glycol, diethylene glycol, triethylene glycol, polyethylene glycol, polypropylene glycol, 1,3-propanediol, 1,3-butanediol, 1,4-butanediol, 3-methyl-1,3-butandiol, 1,5-pentanediol, 1,6-hexanediol, glycerin, 1,2,6-hexanetriol, 1,2,4-butanetriol, 1,2,3-butanetriol, petriol, 2,3-butanediol, tetraethylene glycol, and 2-methyl-2,4-pentanediol, propylene glycol, dipropylene glycol, tripropylene glycol; polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyvalent alcohol aryl ethers such as ethylene glycol monophenyl ether and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam; amides such as formamide, N-methylformamide, formamide, and N,N-dimethylformamide; amines such as monoethanolamine, diethanolamine, triethanolamine, monoethylamine, diethylamine, and triethylamine, sulfur-containing compounds such as dimethylsulfoxide, sulfolane, and thiodiethanol, thiodiglycol, propylene carbonate, ethylene carbonate, and the like. These solvents may be used individually or in combination of two or more. Among them, from the standpoint of obtaining excellent efficacy in preventing jet characteristic failure due to solubility and moisture evaporation, glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, or N-hydroxyethyl-2-pyrrolidone is suitable.

For the content of the water-soluble organic solvent in the recording ink, 15% by mass to 40% by mass is preferable and 20% by mass to 35% by mass is more preferable. If the content is too small, a nozzle is easily dried and discharge failure of droplets may occur, and if the content is excessive, the ink viscosity becomes higher, and may exceed the appropriate viscosity range.

—Surfactant—

As the surfactant, an anionic surfactant, a cationic surfactant, a nonionic surfactant, a fluorochemical surfactant and an ampholytic surfactant are provided. These surfactants can be independently used or used by mixing two types or more.

Examples of the anionic surfactant include alkylallyl, alkylnaphthalenesulfonate, alkylphosphate, alkylsulfate, alkylsulfonate, alkylethersulfate, alkylsulfosuccinate, alkylestersulfate, alkylbenzenesulfonate, alkyldiphenyletherdisulfonate, alkylaryletherphosphate, alkylarylethersulfate, alkylaryletherestersulfate, olefinsulfonate, alkaneolefinsulfonate, polyoxyethylenealkyletherphosphate, polyoxyethylenealkylethersulfic ester salt, ethercarboxylate, sulfosuccinate, α-sulfo fatty acid ester, fatty acid salt, condensates of higher fatty acid and amino acid, polyoxyethylene alkyl ether acetate, dialkyl sulfosuccinate salt, naphthenate, and the like. Among these anionic surfactants, polyoxyethylene alkyl ether acetate or dialkyl sulfosuccinate salt is preferable.

Examples of the nonionic surfactant include an acetylenic glycolic surfactant, polyoxyethylene alkyl ether, polyoxyethylene alkylphenyl ether, polyoxyethylene alkyl ester, polyoxyethylene sorbitan fatty acid ester, and the like.

Examples of the cationic surfactant include alkylamine salt, dialkylamine salt, aliphatic amine salt, benzalkonium salt, quaternary ammonium salt, alkylpyridinium salt, imidazolinium salt, sulfonium salt, phosphonium, and the like.

Examples of the ampholytic surfactant include an imidazoline derivative, such as imidazolinium betaine; dimethylalkyllauryl betaine, allylglycine, alkyldi (aminoethyl) glycine, and the like.

Examples of the fluorochemical surfactant include compounds expressed with any of the following Structural Formulae (1) to (3).

$$CF_3CF_2(CF_2CF_2)_m\text{—}CH_2CH_2O(CH_2CH_2O)_n H \quad \text{Structural Formula (1)}$$

in the Structural Formula (1), 'm' is an integer of 0 to 10, and 'n' is an integer of 1 to 40.

Structural Formula (2)

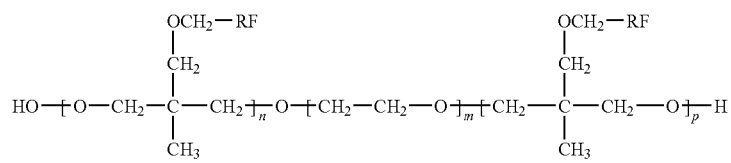

in the Structural Formula (2), 'Rf' is $CF_3$ or $CF_2CF_3$, 'm' is an integer of 6 to 25, 'n' is an integer of 1 to 4, and 'p' is an integer of 1 to 4.

Structural Formula (3)

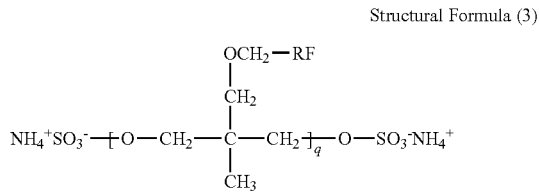

in the Structural Formula (3), 'Rf' is $CF_3$ or $CF_2CF_3$, and 'q' is an integer of 1 to 6.

Examples of the compound having the Structural Formulae (1) to (3) include perfluoroalkylsulfonate, perfluoroalkylcarboxylate, perfluoroalkylphosphate, perfluoroalkylethyleneoxide adducts, perfluoroalkylbetaine, perfluoroalkylamineoxide compounds, and the like.

Commercially available fluorochemical surfactants can be used, including Surflon S-111, S-112, S-113, S-121, S-131, S-132, S-141, and S-145 (by Asahi Glass Co., Ltd.); FLUORAD FC-93, FC-95, FC-98, FC-129, FC-135, FC-170C, FC-430, FC-431, and FC4430 (by Sumitomo 3M Limited); Megafack F-470, F-1405, and F-474 (by Dainippon Ink & Chemicals Inc.); Zonyl FS-300, FSN, FSN-100, FSO (by DuPont Kabushiki Kaisha); EFTOP EF-351, EF-352, EF-801, and EF-802 (by JEMCO Inc). Among them, Zonyl FS-300, FSN, FSN-100, and FSO (by DuPont Kabushiki Kaisha) are particularly preferable in view of excellent reliability and improved color development.

Furthermore, the addition of the surfactant may be appropriately adjusted within a range in which the pigment can be stably dispersed and other efficacies of the present invention will not be lost.

—Aminopropanediol Compound—

The aminopropanediol compound is a water-soluble organic basic compound and preferably, for example, aminopropanediol derivatives.

The aminopropanediol derivatives are not particularly limited and may be appropriately selected according to the purpose. Examples of the aminopropanediol derivatives include 1-amino-2,3-propane diol, 1-methylamino-2,3-propane diol, 2-amino-2-methyl-1,3-propane diol, 2-amino-2-ethyl-1,3-propane diol, and the like. Among them, 2-amino-2-ethyl-1,3-propanediol is particularly preferable.

The addition rate of the aminopropanediol compound in the ink is preferably 0.01% by mass to 10% by mass, more preferably 0.1% by mass to 5.0% by mass, further preferably 0.1% by mass to 2.0% by mass. When the addition rate is excessively high may increase pH, a disadvantage, such as an increase of viscosity, may occur.

The other components are not particularly limited and may be appropriately selected according to the purpose. For example, pH adjusters, preservatives and fungicides, rust prevention agents, antioxidants, ultraviolet absorbers, oxygen absorbers, and light stabilizers may be used.

Examples of the preservatives and fungicides include 1,2-benzisothiazolone-3-on, sodium dehydroacetate, sodium sorbate, 2-pyridinethiol-1-oxide sodium, sodium benzoate, pentachlorophenol sodium, and the like.

The pH adjusters are not particularly limited and any substances may be used according to the purpose as long as they can be used to adjust the pH for 7 or higher without adverse effects on the ink to be prepared.

Examples of the pH adjusters include amines such as diethanolamine and triethanolamine, alkali metal hydroxides such as lithium hydroxide, sodium hydroxide, and potassium hydroxide; ammonium hydroxide, quaternary ammonium hydroxide, quaternary phosphonium hydroxide, alkali metal carbonates such as lithium carbonate, sodium carbonate, potassium carbonate, and the like.

Examples of the rust prevention agents include acidic sulfite, sodium thiosulfate, anmone thioglycolate, diisopropylammoniumnitrite, pentaerythritol tetranitrate, dicyclohexylammoniumnitrite, and the like.

Examples of the antioxidants include phenolic antioxidants (including hindered phenolic antioxidants), amine antioxidants, sulfur antioxidants, phosphorus antioxidants, and the like.

Examples of the phenolic antioxidants (including hindered phenolic antioxidants) include butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tetrakis[methylene-3-(3',5'-di-tert-butyl-4'-hydroxyphenyl)propionate]methane, and the like.

Examples of the amine antioxidants include phenyl-β-naphthylamine, α-naphthylamine, N,N'-di-sec-butyl-p-phenyldiamine, phenothiazine, N,N'-diphenyl-p-phenylene diamine, 2,6-di-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3(3,5-di-tert-butyl-4-dihydroxyphenyl)propionate]methane, 1,1,3-tris(2-methyl-4-hydroxy-5-tert-butylphenyl)butane, and the like.

Examples of the sulfur antioxidants include dilauryl 3,3'-thiodipropionate, distearylthiopropionate, laurylstearylthiopropionate, dimyristyl 3,3'-thiodipropionate, distearyl β,β'-thiodipropionate, 2-mercaptobenzimidazole, dilaurylsulfide, and the like.

Examples of the phosphorus antioxidants include triphenylphosphite, octadecylphosphite, triisodecylphosphite, trilauryltrithiophosphite, trinonylphenylphosphite, and the like.

Examples of the ultraviolet absorbers include benzophenone, benzotriazole, salicylate, cyanoacrylate, nickel complex salt ultraviolet absorbers, and the like.

Examples of the benzophenone ultraviolet absorbers include 2-hydroxy-4-n-octoxybenzophenone, 2-hydroxy-4-n-dodecyloxybenzophenone, 2,4-dihydroxybenzophenone, 2-hydroxy-4-methoxybenzophenone, 2,2',4,4'-tetrahydroxybenzophenone, and the like.

Examples of the benzotriazole ultraviolet absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, 2-(2'-hydroxy-3'-tert-butyl-5'-methylphenyl)-5-chlorobenzotriazole, and the like.

Examples of the salicylate ultraviolet absorbers include phenylsalicylate, p-tert-butylphenylsalicylate, p-octylphenylsalicylate, and the like.

Examples of the cyanoacrylate ultraviolet absorbers include ethyl-2-cyano-3,3'-diphenylacrylate, methyl-2-cyano-3-methyl-3-(p-methoxyphenyl)acrylate, butyl-2-cyano-3-methyl-3-(p-methoxyphenyl)acrylate, and the like.

Examples of the nickel complex salt ultraviolet absorbers include nickelbis(octylphenyl)sulfide, 2,2'-thiobis(4-tert-octylphelate)-n-butylaminenickel (II), 2,2-thiobis(4-tert-octylphelate)-2-ethylhexylaminenickel (II), 2,2'-thiobis(4-tert-octylphelate)triethanolaminenickel (II), and the like.

The recording ink of the present invention is produced by dispersing or dissolving at least water, a colorant, silicone modified acrylic resin fine-particles not containing a hydrolyzable silyl group and a penetrant, and in addition, other components, where necessary into a aqueous solvent, and by additionally by stirring and mixing the product, where necessary. The dispersing may be done by, for example, a sand mill, a homogenizer, a ball mill, a paint shaker, an ultrasonic disperser, and the like. The stirring and mixing may generally be done by, for example, a stirrer having stirring blades, a magnetic stirrer, or a high speed disperser.

Physical properties of the recording ink of the present invention are not particularly limited and may be appropriately selected according to the purpose. For example, the recording ink of the present invention preferably has the following ranges of solid content, viscosity, surface tension, and pH.

For the solid content in the recording ink, 6% by mass to 20% by mass is preferable and 8% by mass to 15% by mass is more preferable. If the solid content is less than 6% by mass, sufficient image density may not be obtainable after printing.

Here, the solid content in the ink in the present invention refers mainly to a colorant and resin fine-particle, which are insoluble in water.

The viscosity is preferably 7 mPa·sec. to 20 mPa·sec., more preferably 5 mPa·sec. to 10 mPa·sec., at 25° C. When the viscosity is higher than 20 mPa·sec., it becomes difficult to ensure stable discharge.

The surface tension is preferably 25 mN/m to 55 mN/m at 20° C. When the surface tension is lower than 25 mN/m, running ink is noticeable on the recording medium and stable jet may not be obtained. When it is higher than 55 mN/m, the ink does not sufficiently infiltrate into the recording medium, which may prolong drying time.

The pH is, for example, preferably 7 to 10.

The coloring of the recording ink of the present invention is not particularly limited and may be appropriately selected according to the purpose. Yellow, magenta, cyan, and black may be used. An ink set containing a combination of two or more of these colorings can be used in recording to form multicolor images. An ink set containing all the colorings can be used in recording to form full color images.

The recording ink of the present invention can be successfully used in printers provided with any types of inkjet heads including a piezo-type in which a piezoelectric element is used to pressurize ink in the ink passage, a diaphragm forming the wall of the ink passage is deformed to change the inner volume of the ink passage, thereby discharging ink droplets (Japanese Patent Application Laid-Open (JP-A) No. 02-51734), a thermal type in which an exothermic resistor is used to heat ink in the ink passage to produce bubbles (Japanese Patent Application Laid-Open (JP-A) No. 61-59911), and an electrostatic type in which a diaphragm forming the wall of the ink passage and electrodes are placed at facing positions and electrostatic force is produced between the diaphragm and the electrodes to deform the diaphragm and change the inner volume of the ink passage, thereby discharging ink droplets (Japanese Patent Application Laid-Open (JP-A) No. 06-71882).

The recording ink of the present invention may be preferably used in a variety of fields. It may be preferably used in image forming apparatus (such as printers) of an inkjet recording system. For example, the recording ink of the present invention can be used in a printer having a function to heat recording papers and the recording ink to 50° C. to 200° C. before, during, or after printing, thereby urging ink fixing. Particularly, the recording ink of the present invention may be preferably used in the ink cartridge, ink record, inkjet recording apparatus, and inkjet recording method of the present invention described hereinafter.

(Ink Cartridge)

The ink cartridge of the present invention comprises a container containing the recording ink of the present invention and other appropriated selected members as required.

The container is not particularly limited and its shape, structure, size, and material are appropriately selected according to the purpose. Preferred embodiments include those at least having an ink pouch formed by aluminum laminated film, resin film, and the like.

Figure 2:
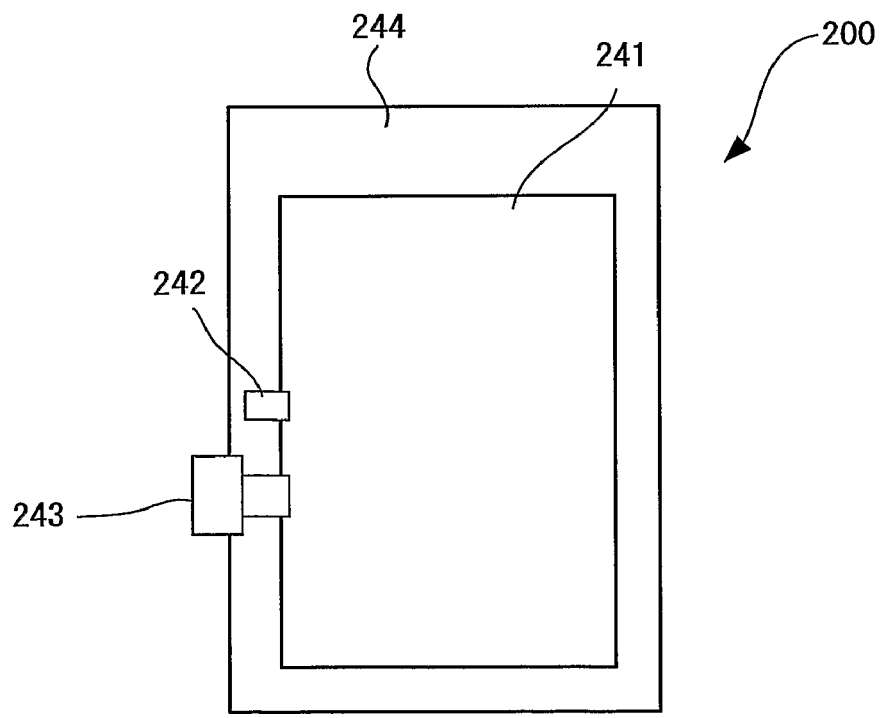
FIG. 2 is an exemplary schematic view also including a case (outer package) of the ink cartridge case shown in FIG. 1.

The ink cartridge is hereinafter described with reference to FIGS. 1 and 2. FIG. 1 is an illustration showing an embodiment of the ink cartridge of the present invention. FIG. 2 is an illustration of the ink cartridge of FIG. 1 including a case (exterior).

In an ink cartridge 200, as shown in FIG. 1, an ink pouch 241 is filled through an ink inlet 242. The ink inlet 242 is closed by fusion bonding after the air is exhausted. An ink outlet 243 made of a rubber material is pierced by a needle on the apparatus body for use, thereby the ink is supplied to the apparatus.

The ink pouch 241 is formed by a packaging member such as a non-permeable aluminum laminated film. The ink pouch 241 is housed in a cartridge case 244 generally made of plastics as shown in FIG. 2 and detachably mounted on various types of inkjet recording apparatus.

The ink cartridge of the present invention contains the recording ink (ink set) of the present invention. The ink cartridge of the present invention may be detachably mounted on variety types of inkjet recording apparatus and it is particularly preferable that the ink cartridge of the present invention is detachably mounted on the inkjet recording apparatus of the present invention described later.

(Inkjet Recording Apparatus and Inkjet Recording Method)

The inkjet recording apparatus of the present invention has at least an ink drop discharging unit, and additionally has other units appropriately selected according to the purpose, such as an impulse generating unit or a controlling unit.

The inkjet recording method of the present invention at least comprises the ink drops discharging unit, and additionally comprises other units appropriately selected according to the purpose, such as an impulse generating unit, a controlling unit, and the like.

The inkjet recording method of the present invention is preferably performed in the inkjet recording apparatus of the present invention. The ink drops discharging step is preferably performed by the ink drops discharging unit. Further, the other steps are preferably performed by the other units.

—Ink Drops Discharging Step and Ink Drops Discharging Unit—

The ink drops discharging step is a step of discharging the ink drops to form an image by applying impulse to the ink.

The ink drops discharging unit is a unit configured to discharge the ink drops to form an image by applying impulse to the ink.

The ink drops discharging unit is not particularly limited, for example, include various nozzles for discharging ink.

It is preferable that the liquid chamber, fluid dragging part, diaphragm, and nozzle member of the nozzle head part be at least partly made of materials containing at least either silicon or nickel.

The nozzle diameter of the nozzle head part is preferably 30 µm or less and more preferably 1 µm to 20 µm.

It is preferable that subtanks for supplying ink be provided on the inkjet head and the ink is supplied to the subtanks from the ink cartridge via supply tubes.

The impulse may be generated by, for example, the impulse generation unit. The impulse is not particularly limited and may be appropriately selected according to the purpose. Examples of the impulse include heat (temperature), pressure, vibration, and light. These can be used individually or in combination or two or more. Among them, heat and pressure are preferable.

The impulse generation unit may be, for example, a heating apparatus, a pressurizing apparatus, a piezoelectric element, a vibration generation apparatus, an ultrasonic oscillator, a light, and the like. Specifically, examples of the impulse generation unit include a piezoelectric actuator such as a piezoelectric element, a thermal actuator using an electrothermal conversion element such as an exothermic resistor to cause film boiling and, accordingly, phase change of a liquid, a shape-memory alloy actuator using metal phase changes due to temperature changes, an electrostatic actuator using electrostatic force, and the like.

The aspect of the ink drops discharging is not particularly limited, and varies depending on the type of the impulse. For example, when the impulse is "heat," thermal energy corresponding to recording signals is applied to the ink in the recording head, for example, using a thermal head, the thermal energy causes the ink to bubble, and the bubble pressure urges the ink to be discharged as ink droplets from the nozzle hole of the recording head. When the impulse is "pressure," for example, an electric voltage is applied to a piezoelectric element bonded at a position called a pressure chamber within the ink passage of the recording head, the piezoelectric element is bent and the pressure chamber is reduced in volume, thereby the ink is discharged as droplets from the nozzle hole of the recording head.

The ink droplets before discharging preferably have a particle size of 3 pl to 40 pl, a discharge jet speed of 5 m/sec. to 20 m/sec., a driving frequency of 1 kHz or higher, and a resolution of 300 dpi or higher.

It is preferable to have a reversing unit to reverse the recording surface of a recording medium and to enable double-sided printing. As the reversing unit, a conveying belt having an electrostatic force, a unit maintaining a recording medium due to air suction and a combination of a conveying roller and spur are provided.

It is preferable to have an endless conveying belt, and a conveying unit configured to convey a recording medium while the surface of the conveying belt is electrified and the recording medium is maintained. In this case, it is especially preferable to electrify the conveying belt by applying an AC bias with ±1.2 kV to ±2.6 kV to an electrically-charged roller.

The controlling unit is not particularly limited and may be appropriately selected according to the purpose as long as it is capable of controlling the operation of each unit. Examples of the controlling unit include devices such as a sequencer, a computer, and the like.

An embodiment of the inkjet recording method of the present invention using the inkjet recording apparatus of the present invention is described hereinafter, with reference to the drawings. An inkjet recording apparatus shown in FIG. 3 comprises apparatus body 101, feeder tray 102 attached to the apparatus body 101 for feeding papers, paper output tray 103 attached to the apparatus body 101 for receiving papers on which images are recorded (formed), and an ink cartridge mounting part 104. Operation part 105 having operation keys and indicators is provided on the top surface of the ink cartridge mounting part 104. The ink cartridge mounting part 104 has front cover 115 that can be opened and/or closed to remove and/or place ink cartridges 201.

Figure 4:
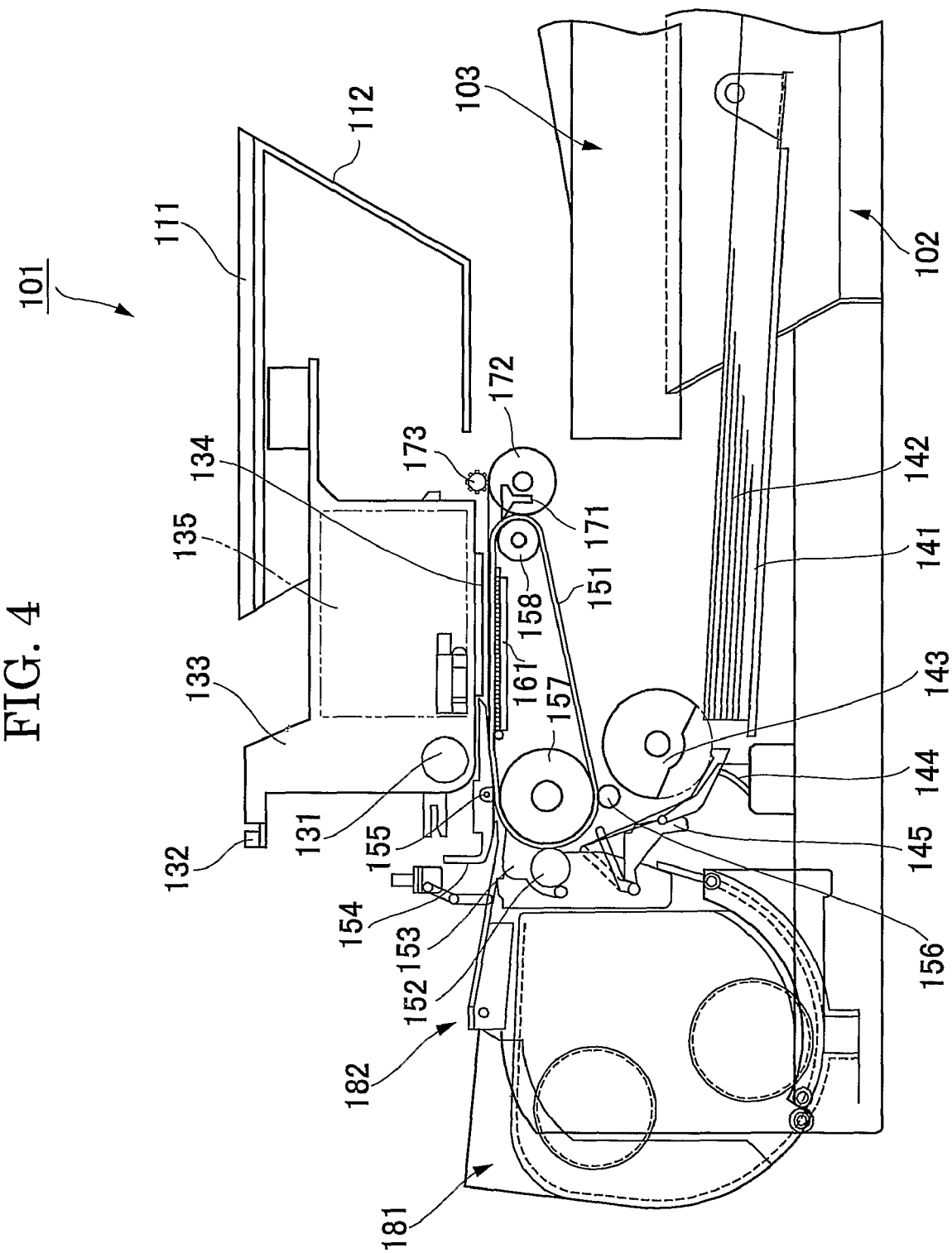
FIG. 4 is an exemplary schematic block diagram explaining the entire construction of the inkjet recording apparatus.
Figure 5:
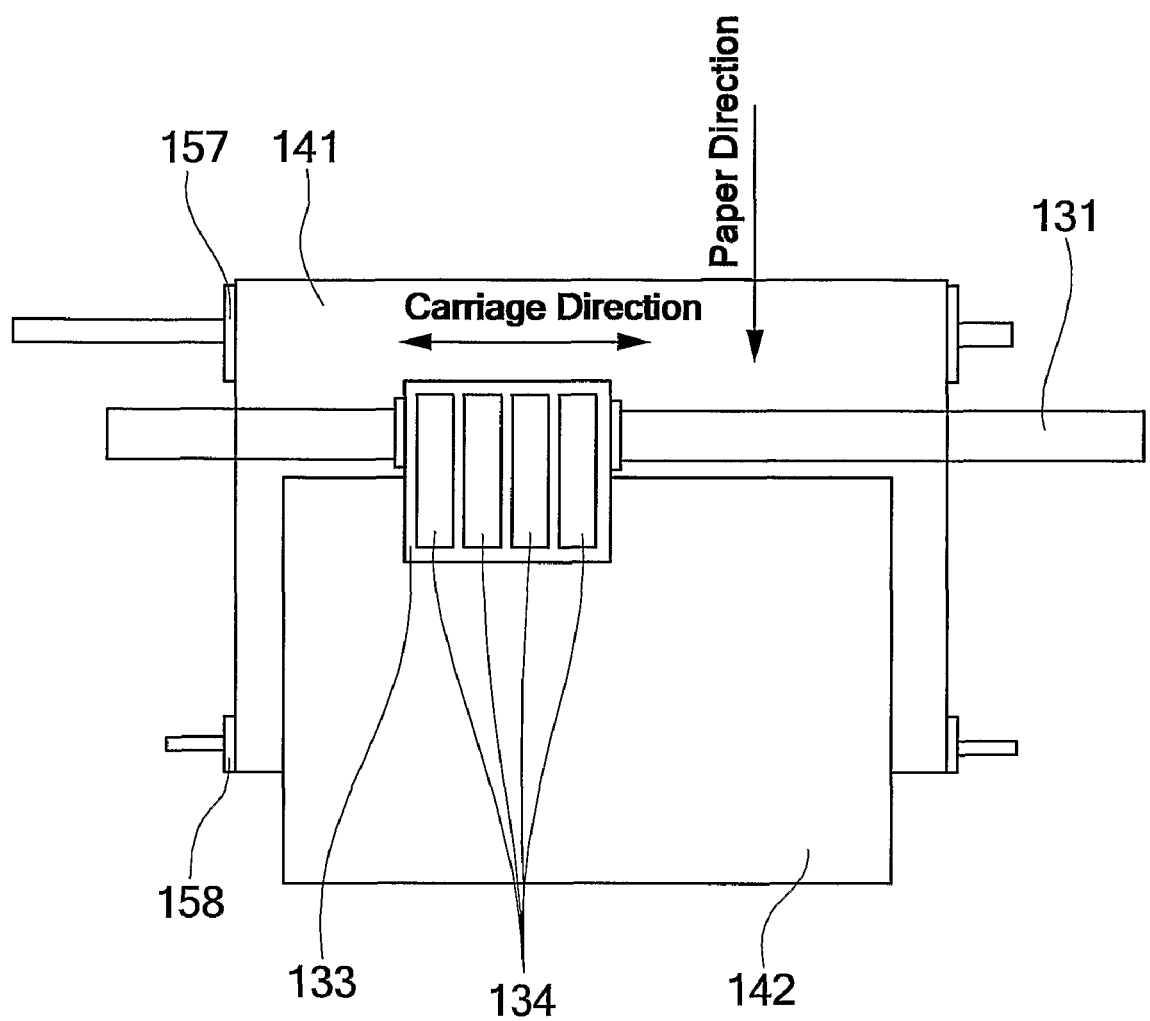
FIG. 5 is an enlarged schematic view showing an example of the inkjet head of the present invention.

As shown in FIGS. 4 and 5, carriage 133 is supported slidably in the scan direction by guide rod 131 that is a guide member laid across not shown right and left side plates and stay 132 and moved by a main motor (not shown) in the arrowed directions in FIG. 5 for scanning within the apparatus body 101.

Recording heads 134 consisting of four inkjet recording heads that discharge yellow (Y), cyan (C), magenta (M), and black (B) recording ink droplets, respectively, have ink discharge ports arranged in the intersecting direction with the main scanning direction and they are placed with their ink discharge direction downward.

Inkjet recording heads constituting the recording heads 134 are provided with an energy generation unit for discharging recording ink such as a piezoelectric actuator such as an piezoelectric element, a thermal actuator using an electrothermal conversion element such as an exothermic resistor to cause film boiling and, accordingly, phase change of a liquid, a shape-memory alloy actuator using metal phase changes due to temperature changes, and an electrostatic actuator using electrostatic force.

The carriage 133 is provided with subtanks 135 for supplying each color ink to the recording heads 134. The subtanks 135 are filled with the recording ink of the present invention from the ink cartridge 201 of the present invention mounted in the ink cartridge mounting part 105 via a not-shown recording ink supply tube.

On the other hand, a paper feed part for feeding paper 142 stuck on paper load part (platen) 141 of the feed tray 102 comprises a half-moon roller (feed roller 143) that separates and supplies the paper 142 from the paper load part 141 one by one and separation pad 144 that faces the feed roller 143 and is made of a large friction coefficient material. The separation pad 144 is biased toward the feed roller 143.

A conveying part for conveying the paper 142 supplied from the feed part underneath the recording heads 134 comprises a conveying belt 151 for electrostatically adsorbing and conveying the paper 142, counter roller 152 for conveying the paper 142 sent from the paper feed part via guide 145 by clamping it together with the conveying belts 151, conveying guide 153 for turning the paper 142 sent nearly vertically by 90° so as to lay it on the conveying belt 151, and leading end pressure roller 155 that is biased toward the conveying belt 151 by presser member 154. Charging roller 156 that is a charging unit for charging the surface of the conveying belt 151 is also provided.

The conveying belt 151 is an endless belt, being placed over conveying roller 157 and a tension roller 158 and running around in the belt conveying direction. For example, the conveying belt 151 has a front layer that is a paper adsorbing surface made of a dragging-uncontrolled resin, for example a copolymer of tetrafluoroethylene and ethylene (ETFE), having a thickness of 40 µm and a back layer (an intermediate dragging layer or an earth layer) made of the same material as the front layer, but dragging-controlled with carbon. Guide member 161 is provided behind the conveying belt 151 at the corresponding position to the printing area by the recording heads 134. An output part for discharging the paper 142 on which recording was done by the recording heads 134 comprises separation click 171 for separating the paper 142 from the conveying belt 151, paper output roller 172, and paper output roller 173. Paper output tray 103 is disposed below paper output roller 172.

Double-side feed unit 181 is detachably mounted in the back of the apparatus body 101. The double-side feed unit 181 takes in the paper 142 that is moved backward as the conveying belt 151 is rotated in the reverse direction, turns it over, and feeds it again between the counter roller 152 and the conveying belt 151. Manual feeder 182 is provided on the top surface of the double-side feed unit 181.

In this inkjet recording apparatus, the paper 142 is separated and fed from the paper feed part one by one. Being fed vertically, the paper 142 is guided by the guide 145 and conveyed between the conveying belt 151 and the counter roller 152. Then, it is guided by the conveying guide 153 at the leading end and is pressed against the conveying belt 151 by the leading end pressure roller 155 to change the convey direction substantially by 90°.

Meanwhile, the conveying belt 157 is charged by the charging roller 156 and the paper 142 is electrostatically adsorbed and conveyed by the conveying belt 151. Then, the recording heads 134 are driven according to image signals while the carriage 133 is moved. Ink droplets are discharged on the paused paper 142 for recording one-line. Then, the paper 142 is conveyed by a certain rate for recording the next line. Receiving a recording end signal or a signal indicating the rear end of the paper 142 has reached the recording area, the recording operation is terminated and the paper 142 is discharged to the paper output tray 103.

When it is detected that the remaining amount of the recording ink in the subtank 135 is nearly to the end, a certain amount of recording ink is supplied to the subtank 135 from the ink cartridge 201.

In this inkjet recording apparatus, when the recording ink in the ink cartridge 201 of the present invention is used up, the case of the ink cartridge 201 is disassembled and only the ink pouch contained therein can be exchanged. The ink cartridge 201 allows for stable recording ink supply even in a vertical and front mounting structure. Therefore, when the apparatus body 101 is installed with the top being blocked by something, for example, the ink cartridge 210 can be housed in a rack. Even if something is placed on the top surface of the apparatus body 101, the ink cartridge 201 can be easily replaced.

Here, the explanation is made with reference to an application in a serial type (shuttle type) inkjet recording apparatus in which the carriage scans is described. A line type inkjet recording apparatus having a line head is also applicable.

The inkjet recording apparatus and inkjet recording method of the present invention are applicable to various recording in an inkjet recording system. For example, the inkjet recording apparatus and inkjet recording method of the present invention can be particularly preferably applied to inkjet recording printers, facsimiles, copy machines, and printer/fax/copy complex machines.

An inkjet head to which the present invention is applied is described hereinafter.

Figure 6:
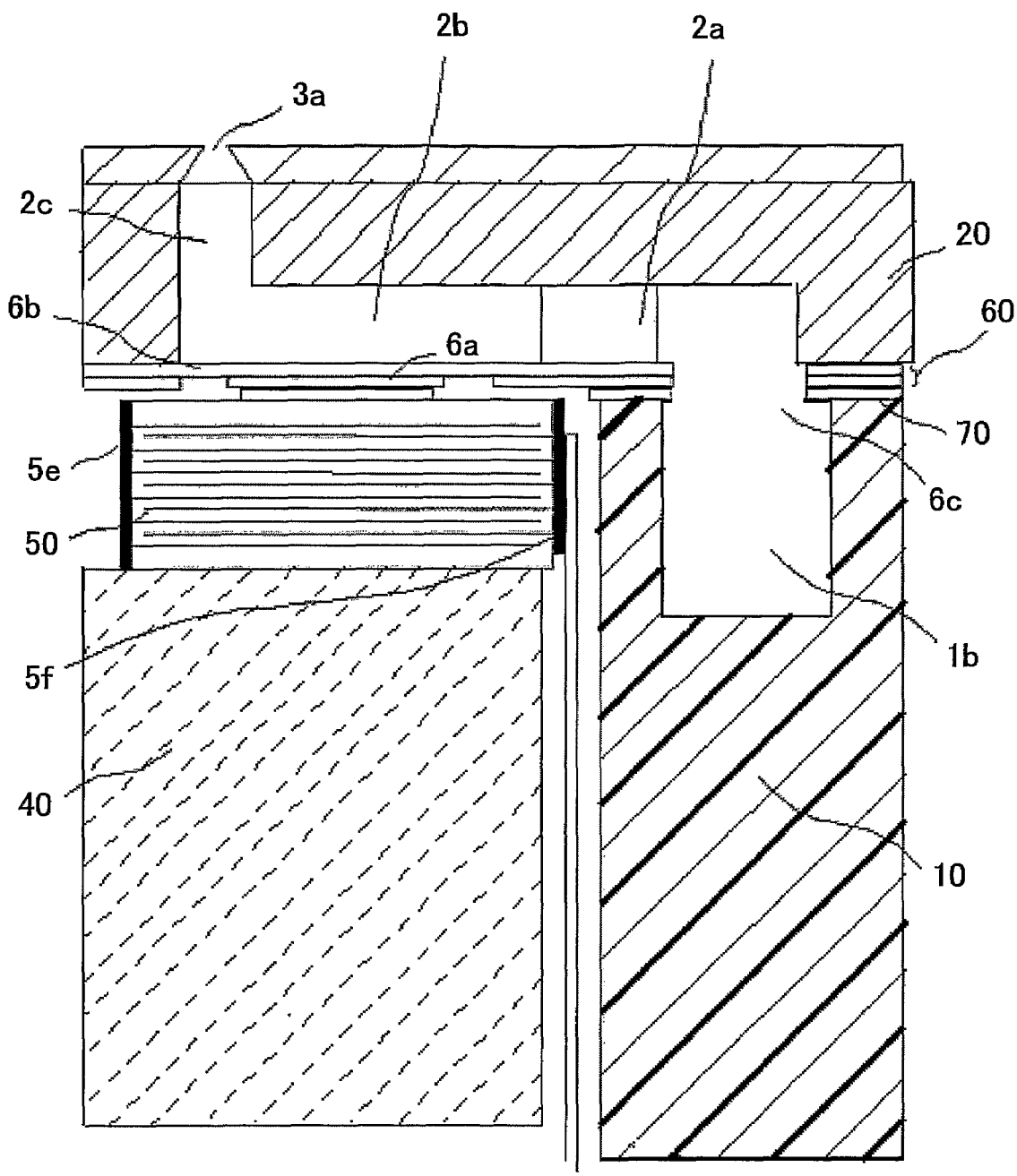
FIG. 6 is an enlarged element view showing an example of the inkjet head of the present invention.
Figure 7:
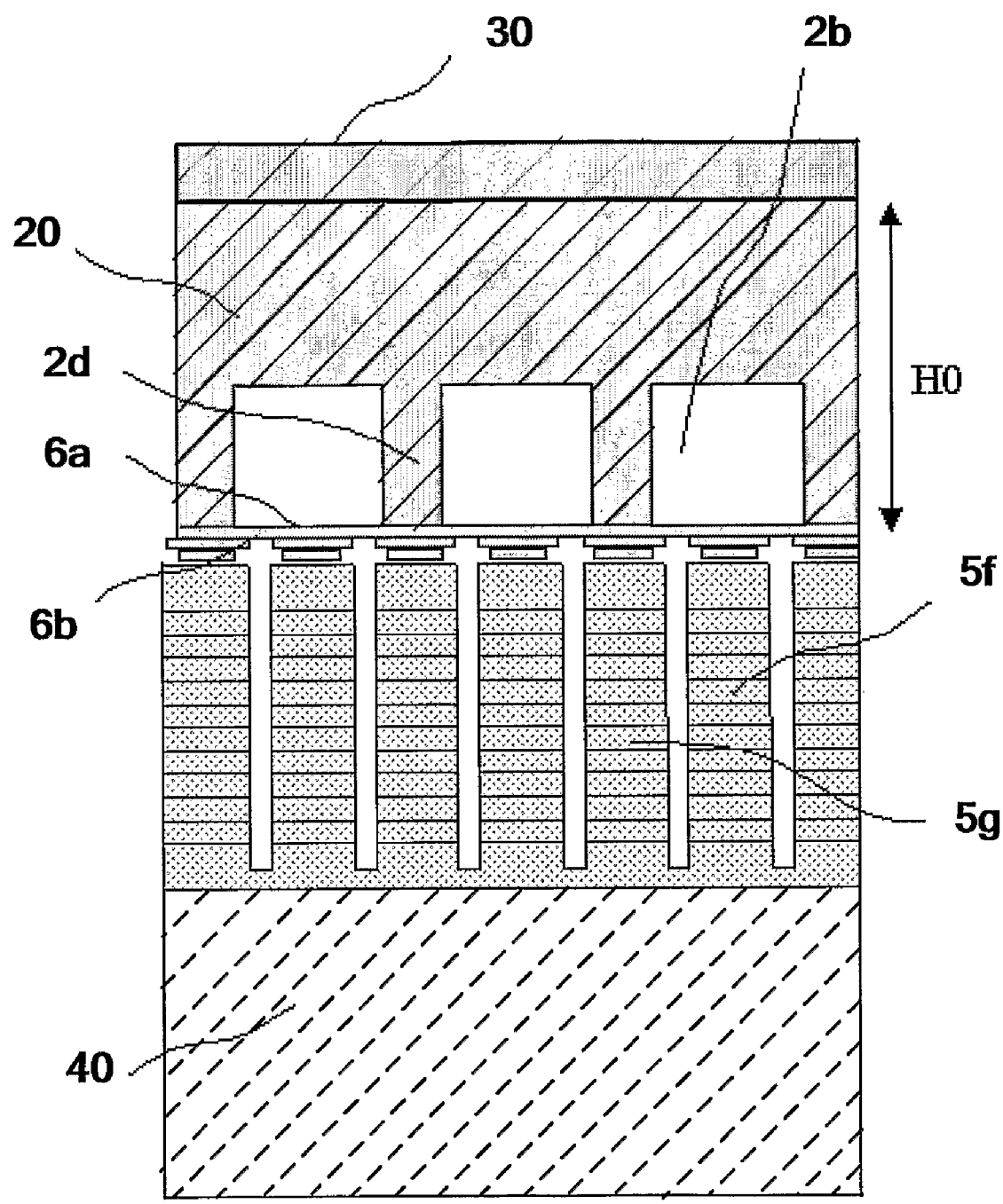
FIG. 7 is an enlarged cross sectional view of a main section showing an example of the inkjet head of the present invention.

FIG. 6 is an enlarged view of the core part of the inkjet head according to an embodiment of the present invention. FIG. 7 is an enlarged cross-sectional view of the core part of the same head in the inter-channel direction.

This inkjet head comprises frame 10 having cutouts serving as an ink supply port (not shown) and a common liquid chamber 1*b*, passage plate 20 having cutouts serving as fluid dragging part 2*a* and pressurized liquid chamber 2*b* and communication port 2*c* that communicates to nozzle 3*a*, diaphragm 60 having raised part 6*a*, diaphragm part 6*b*, and ink inflow port 6*c*, laminated piezoelectric element 50 connected to the diaphragm 60 via adhesive layer 70, and base 40 on which the laminated piezoelectric element 50 is fixed.

The base 40 is made of barium titanate ceramics, on which two rows of laminated piezoelectric element 50 are arranged and connected.

The piezoelectric element 50 consists of alternately laminated piezoelectric layers of lead zirconate titanate (PZT) having a thickness of 10 μm to 50 μm per layer and internal electrode layers of silver palladium (AgPd) having a thickness of several μm per layer. The internal electrode layers are connected to external electrodes at both ends.

The laminated piezoelectric element 50 is divided into a comb-like shape by half-cut dicing, having driving parts 5*f* and supporting parts (non-driving part) 5 g every other division. The exterior of the external electrodes is processed, for example notched, for limiting on length, thereby being divided by half-cut dicing. Multiple separate electrodes are formed. Not divided by dicing, the other is conductive and serves as a common electrode.

A FPC8 is soldered to the individual electrodes of the driving part. The common electrode is turned in an electrode layer provided at the end of the laminated piezoelectric layer and connected to the Gnd electrode of the FPC8. An unshown driver IC is mounted on the FPC8 to control the application of driving voltage to the driving part 5*f*.

As for the diaphragm 60, thin film diaphragm part 6*b*, island-shaped raised part (island part) 6*a* formed at the center of the diaphragm part 6*b* and connected to the laminated piezoelectric element 50 serving as the driving parts 5*f*, a thick part including beams to be connected to the supporting part, and an opening serving as in ink inflow port 6*c* are formed by electroforming two nickel plated films. The diaphragm has a thickness of 3 μm and a width (one side) of 35 μm.

The connections between the island part 6*a* of the diaphragm 60 and the movable parts 5*f* of the laminated piezoelectric element 50 and between the diaphragm 50 and the frame 10 are made by patterning the adhesive layer 70 including a gap material.

The passage plate 20 is made of a silicon mono-crystalline substrate, in which cutouts serving as liquid dragging part 2*a* and pressurized liquid chamber 2*b* and a through-hole provided at the corresponding position to the nozzle 3*a* and serving as communication port 2*c* are patterned by etching.

The remaining part after the etching serves as a partition wall 2*d* of the pressurized liquid chamber 2*b*. In this head, a part etched in a smaller width serves as the liquid dragging part 2*a*.

The nozzle plate 30 is made of a metal material such as a nickel plated film formed by electroforming and has a number of nozzles 3*a* serving as fine discharge openings for discharging ink droplets. The nozzle 3*a* has a horn-like (substantially cylindrical or substantially truncated cone) internal shape (inner shape). The nozzle 3*a* has a diameter of approximately 20 μm to 35 μm at the ink droplets discharge side. The nozzle pitch in each row is 150 dpi.

The ink discharging surface (nozzle front side) of the nozzle plate 30 is provided with a water-repellent finish layer 3*b* having a not shown water-repellent finish surface. A water-repellent finish film selected according to ink's physical properties such as PTFE-Ni eutectoid plating and electrodeposition of fluororesin, deposition of volatile fluororesin, silicone resin and fluororesin solvent application and baking can be provided to stabilize ink droplet shapes and discharging property and, thus, ensure a high image quality. Among them, for example many fluororesins are known; excellent water-repellency can be obtained by depositing modified perfluoropolyoxethane (by Daikin Industies, Ltd, trade name: Optool DSX) to a thickness of 30 Å to 100 Å.

The frame 10 in which cutouts serving as an ink supply inlet and a common liquid chamber 1b are formed is made by molding a resin.

In an inkjet head having the above structure, a driving waveform (10V to 50V pulse voltage) is applied to the driving part 5f according to recording signals. The driving part 5f is shifted in the lamination direction. The pressurized liquid chamber 2b is pressurized via the diaphragm 30 and the pressure is increased, thereby ink droplets are discharged through the nozzle 3a.

After the ink droplets discharge is completed, the ink pressure in the pressurized liquid chamber 2b is decreased. The inertia ink flow and driving pulse discharge process causes negative pressure within the pressurized liquid chamber 2b, leading to the ink supply step. Meanwhile, the ink supplied from the ink tank enters the common liquid chamber 1b and further fills the pressurized liquid chamber 2b from the common liquid chamber 1b via the ink inflow port 6c and fluid dragging part 2a.

The fluid dragging part 2a effectively attenuates residual pressure fluctuation while it stands against recharging (refilling) due to surface tension. Appropriately selected dragging part balances residual pressure attenuation with refilling time and shortens the transition time to the next ink droplets discharge operation (driving cycle).

(Ink Record)

The ink record recorded by the inkjet recording apparatus and inkjet recording method of the present invention is the ink record of the present invention. The ink record of the present invention comprises images formed on recording media using the recording ink of the present invention.

The recording media are not particularly limited and may be appropriately selected according to the purpose. Examples of the recording media include regular papers, glossy papers, special papers, cloths, films, and OHP sheets. These can be used individually or in combination of two or more.

The ink record has high quality, no running ink, and excellent temporal stability, thereby being preferably used in various applications as documents in which various texts and images are recorded.

EXAMPLE

Examples of the present invention are described hereinafter. However, the present invention is not limited to these examples. All percentages and parts are by mass unless indicated otherwise.

Preparation Example 1

—Preparation of Surface-Treated Carbon Black Pigment Dispersion—

The addition of 90 g of carbon black, where the CTAB specific surface area is 150 m²/g and the DBP oil absorption is 100 ml/100 g, to 3,000 ml of 2.5 N sodium sulfate solution was added, and stirred at 60° C., 300 rpm, and oxidation accomplished by reaction for 10 hours. The reaction liquid was filtered; the filtered carbon black neutralized with a sodium hydroxide solution; and ultra-filtration accomplished. The obtained carbon black was rinsed with water and dried, and dispersed in the purified water so as to form 20% by mass of the pigment concentration, by which process the surface-treated carbon black pigment dispersion was prepared.

Preparation Example 2

—Preparation of Surface-Treated Yellow Pigment Dispersion—

A yellow pigment was produced where C. I. Pigment Yellow 128 was plasma-treated at low temperature and a carboxyl group was introduced. A liquid where yellow pigment was dispersed in the deionized water was de-mineralized and concentrated with an ultra-filter, and a yellow pigment dispersion of 15% by mass of pigment concentration was prepared.

Preparation Example 3

—Preparation of Surface-Treated Magenta Pigment—

Magenta pigment where a carboxyl group was introduced was similarly prepared in Preparation example 2 except that C.I. Pigment Yellow 128 was replaced with C. I. Pigment Red 122.

The obtained surface-treated magenta pigment was easily dispersed in a aqueous solvent during stirring.

Preparation Example 4

—Preparation of Surface-Treated Cyan Pigment—

Cyan pigment where a carboxyl group was introduced was similarly prepared in Preparation example 2 except that C. I. Pigment Yellow 128 was replaced with C. I. Pigment Cyan 15:3.

The obtained surface-treated cyan pigment was easily dispersed in an aqueous solvent during stirring.

Synthesis Example 1

—Synthesis of Polymer Dispersion—

First, the inside of a 1 L flask equipped with a mechanical stirrer, a thermometer, a nitrogen gas inlet tube, a reflux tube and a dropping funnel was sufficiently purged, with nitrogen gas. Then 11.2 g of styrene, 2.8 g of acrylic acid, 12.0 g of lauryl methacrylate, 4.0 g of polyethylene glycol methacrylate, 4.0 g of styrene macromer (manufactured by Toagosei Co., Ltd., product name: AS-6) and 0.4 g of mercaptoethanol were introduced and heated to 65° C. Next, a mixed solution with 100.8 g of styrene, 25.2 g of acrylic acid, 108.0 g of lauryl methacrylate, 36.0 g of polyethylene glycolmethacrylate, 60.0 g of hydroxyethylmethacrylate, 36.0 g of styrene macromer (manufactured by Toagosei Co., Ltd., product name: AS-6), 3.6 g of mercaptoethanol, 2.4 g of azobis dimethyl valeronitrile and 18 g of methyl ethyl ketone was titrated into the flask over 2.5 hours. After the titration was completed, a mixed solution with 0.8 g of azobis dimethyl valeronitrile and 18 g of methyl ethyl ketone was titrated into the flask for 0.5 hour. After maturing at 65° C. for 1 hour, 0.8 g of azobis dimethyl valeronitrile was added, and the product was additionally matured for 1 hour. After the reaction was completed, 364 g of methyl ethyl ketone was added, and 800 g of polymer solution of 50% by mass was obtained.

Preparation Example 5

—Preparation of Polymer Fine-Particles Dispersion Containing—Phthalocyanine Pigment After 28 g of the polymer solution prepared in Synthesis example 1, 26 g of phthalocyanine pigment, 13.6 g of 1 mol/L potassium hydroxide solution, 20 g of methyl ethyl ketone and 30 g of deionized water were sufficiently stirred and mixed using three roll mills.

The obtained paste was added to 200 g of deionized water, and after being sufficiently stirred, methyl ethyl ketone and water were distilled away using an evaporator, and a cyan polymer fine-particles dispersion was prepared.

Preparation Example 6

—Preparation of Polymer Fine-Particles Dispersion Containing Dimethyl Quinacridon Pigment—

A magenta polymer fine-particles dispersion was similarly prepared in Preparation example 5 except that the phthalocyanine pigment was replaced with C. I. Pigment Red 122.

Preparation Example 7

—Preparation of Polymer Fine-Particles Dispersion Containing Monoazo Yellow Pigment—

A yellow polymer fine-particles dispersion was similarly prepared in Preparation example 5 except that the phthalocyanine pigment was replaced with a pigment C.I. Pigment Yellow 74.

Preparation Example 8

—Preparation of Polymer Fine-Particles Dispersion Containing Carbon Black Pigment—

A black polymer fine-particles dispersion was similarly prepared in Preparation example 5 except for changing the phthalocyanine pigment was replaced with a carbon black.

Synthesis Example 2

—Synthesis of Silicone Modified Acrylic Resin Fine-Particles not Containing Reactive Silyl Group—

First, the inside of a flask, which was equipped with a mechanical stirrer, a thermometer, a nitrogen gas inlet tube, a flux tube and a dropping funnel was sufficiently purged with nitrogen gas. Then, 10 g of Aqua-on RN-20 (manufactured by Dai-Ichi Kogyo Seiyaku Co., Ltd.), 1 g of potassium persulfate and 286 g of purified water were introduced and heated to 65° C. Next, a mixed solution with 150 g of methyl methacrylate, 100 g of acrylic acid-2-ethylhexyl, 20 g of acrylic acid, 20 g of vinyltriethoxysilane, 10 g of Aqualon RN-20 (manufactured by Dai-Ichi Kogyo Seiyaku Co., Ltd.), 4 g of potassium persulfate and 398.3 g of purified water was titrated into the flask over 2.5 hours. After heating and maturing at 80° C. for an another 3 hours, the product was cooled down and the pH adjusted to 7 to 8 with potassium hydroxide.

A peak of $^{29}$Si—NMR of the obtained silicone modified acrylic resin fine-particles was compared with a peak of $^{29}$Si—NMR of the raw material, and because the peak by the hydrolyzable silyl group disappeared, it was confirmed that there was no reactive silyl group.

<Measurement Conditions for $^{29}$Si—NMR>

Equipment: NMR (Solid Measurement)
  SR-MAS (Sweat Resin-Magic Angle Spinning)—$^{29}$Si—NMR measurement was conducted.
Test tube: made from zirconia
Cap: made from Daifron The volume average particle diameter (D50%) of the obtained silicone modified acrylic resin fine-particles not containing a reactive silyl group measured with a particle diameter analyzer (Microtrac UPA manufactured by NIKKISO Co., Ltd.) was 130 nm. Further, the minimum film forming temperature (MFT) measured by the film formation temperature meter was 0° C.

Synthesis Example 3

—Synthesis of Silicone Modified Acrylic Resin Fine-Particles not Containing Reactive Silyl Group—

Firsts, the inside of a flask equipped with a mechanical stirrer, a thermometer, a nitrogen gas inlet tube, a flux tube and a dropping funnel was sufficiently purged with nitrogen gas. Then, 10 g of Aqualon RN-20 (manufactured by Dai-Ichi Kogyo Seiyaku Co., Ltd.), 1 g of potassium persulfate and 286 g of purified water were introduced and heated to 65° C. Next, a mixed solution with 150 g of methyl methacrylate, 100 g of acrylic acid-2-ethylhexyl, 20 g of acrylic acid, 40 g of hexyltrimethoxysilane, 10 g of Aqualon RN-20 (manufactured by Dai-Ichi Kogyo Seiyaku Co., Ltd.), 4 g of potassium persulfate and 398.3 g of purified water was titrated into the flask over 3 hours. After maturing by heating at 80° C. for another 3 hours, the product was cooled down and the pH adjusted to 7 to 8 with potassium hydroxide.

With regard to the obtained silicone modified acrylic resin fine-particles, as with Synthesis example 2, a peak of $^{29}$Si—NMR was compared with a peak of $^{29}$Si—NMR of the raw material, and because the peak by the hydrolyzable silyl group disappeared, it was confirmed that there was no reactive silyl group.

The volume average particle diameter (D50%) of the obtained silicone modified acrylic resin fine-particles not containing a reactive silyl group measured with the particle diameter analyzer (Microtrac UPA manufactured by NIKKISO Co., Ltd.) was 148 nm. Further, the minimum film forming temperature (MFT) measured by the film formation temperature meter was 0° C.

Synthesis Example 4

—Synthesis of Silicone Modified Acrylic Resin Fine-Particles Containing Reactive Silyl Group—

In order to double-check an example described in Japanese Patent Application Laid-Open (JP-A) No. 6-157861, the silicone modified acrylic resin fine-particles containing the reactive silyl group was synthesized.

First, the inside of a flask equipped with a mechanical stirrer, a thermometer, a nitrogen gas inlet tube, a flux tube and a dropping funnel was sufficiently purged with nitrogen gas. Then, 100 g of purified water, 3 g of sodium dodecyl benzenesulfonate and 1 g of polyethylene glycol nonylphenylether were introduced; 1 g of ammonium persulfate and 0.2 g of sodium hydrogensulfite were added; and the temperature increased to 60° C. Next, 30 g of butyl acrylate, 40 g of methyl methacrylate, 19 g of butyl methacrylate, 10 g of vinylsilane triol potassium salt and 1 g of 3-methacryloxy propylmethyldimethoxysilane were titrated into the flask over 3 hours. A polymerization reaction liquid at this time was adjusted to be pH 7 with an ammonium solution, and polymerization was performed.

With regard to the obtained silicone modified acrylic resin fine-particles, as similar to Synthesis example 2, a peak of $^{29}$Si—NMR was compared with a peak of $^{29}$Si—NMR of the raw material, and because the peak by the hydrolyzable silyl group appeared, it was confirmed that there was reactive silyl group.

The volume average particle diameter (D50%) of the obtained silicone modified acrylic resin fine-particles containing a reactive silyl group measured with the particle diameter analyzer (Microtrac UPA manufactured by NIKKISO Co., Ltd.) was 160 nm. Further, the minimum film forming temperature (MFT) measured by the film formation temperature meter was 0° C.

Synthesis Example 5

—Synthesis of Silicone Modified Acrylic Resin Fine-Particles not Containing Reactive Silyl Group—

First, the inside of a flask equipped with a mechanical stirrer, a thermometer, a nitrogen gas inlet tube, a flux tube, and a dropping funnel was sufficiently purged with nitrogen gas. Then, 10 g of Aqualon RN-20 (manufactured by Dai-Ichi Kogyo Seiyaku Co., Ltd.), 1 g of potassium persulfate and 286 g of purified water were introduced and heated to 65° C. Next, a mixed solution with 150 g of methyl methacrylate, 100 g of acrylic acid-2-ethylhexyl, 20 g of acrylic acid, 40 g of hexyltrimethoxysilane, 10 g of Aqualon RN-20 (manufactured by Dai-Ichi Kogyo Seiyaku Co., Ltd.), 4 g of potassium persulfate and 398.3 g of purified water was titrated into the flask over 3 hours. After maturing by heating at 80° C. for another 3 hours, the product was cooled down and the pH adjusted to 7 to 8 with potassium hydroxide.

With regard to the obtained silicone modified acrylic resin fine-particles, as with Synthesis example 2, a peak of $^{29}$Si—NMR was compared with a peak of $^{29}$Si—NMR of the raw material, and because the peak by the hydrolyzable silyl group disappeared, it was confirmed that there was no reactive silyl group.

The volume average particle diameter (D50%) of the obtained silicone modified acrylic resin fine-particles not containing a reactive silyl group measured with the particle diameter analyzer (Microtrac UPA manufactured by NIKKISO Co., Ltd.) was 310 nm. Further, the minimum film forming temperature (MFT) measured by the film formation temperature meter was 0° C.

Synthesis Example 6

—Synthesis of Silicone Modified Acrylic Resin Fine-Particles not Containing Reactive Silyl Group—

First, the inside of a flask equipped with a mechanical stirrer, a thermometer, a nitrogen gas inlet tube, a flux tube and a dropping funnel as sufficiently purged with nitrogen gas. Then, 30 g of Aqualon RN-20 (manufactured by Dai-Ichi-Kogyo Seiyaku Co., Ltd.), 1 g of potassium persulfate and 286 g of purified water were introduced and heated to 65° C. Next, a mixed solution with 150 g of methyl methacrylate, 100 g of acrylic acid-2-ethylhexyl, 20 g of acrylic acid, 20 g of vinyltriethoxysilane, 30 g of Aqualon RN-20 (manufactured by Dai-Ichi Kogyo Seiyaku Co., Ltd.), 4 g of potassium persulfate and 400 g of purified water was titrated into the flask over 2.5 hours. After maturing by heating at 80° C. for another 3 hours, the product was cooled down and the pH adjusted to 7 to 8 with potassium hydroxide.

With regard to the obtained silicone modified acrylic resin fine-particles, as with Synthesis example 2, a peak of $^{29}$Si—NMR was compared with a peak of $^{29}$Si—NMR of the raw material, and because the peak by the hydrolyzable silyl group disappeared, it was confirmed that there was no reactive silyl group.

The volume average particle diameter (D50%) of the obtained silicone modified acrylic resin fine-particles not containing a reactive silyl group measured with the particle diameter analyzer (Microtrac UPA manufactured by NIKKISO Co., Ltd.) was 48 nm. Further, the minimum film forming temperature (MFT) measured by the film formation temperature meter was 0° C.

Synthesis Example 7

—Synthesis of Silicone Modified Acrylic Resin Fine-Particles not Containing Reactive Silyl Group—

First, the inside of a flask equipped with a mechanical stirrer, a thermometer, a nitrogen gas inlet tube, a flux tube and a dropping funnel was sufficiently purged with nitrogen gas. Then, 130 g of Aqualon RN-20 (manufactured by Dai-Ichi Kogyo Seiyaku Co., Ltd.), 1 g of potassium persulfate and 286 g of purified water were introduced and heated to 65° C. Next, a mixed solution with 150 g of methyl methacrylate, 100 g of acrylic acid-2-ethylhexyl, 20 g of acrylic acid, 20 g of vinyltriethoxysilane, 30 g of Aqualon RN-20 (manufactured by Dai-Ichi Kogyo Seiyaku Co., Ltd.), 4 g of potassium persulfate and 400 g of purified water was titrated into the flask over 2.5 hours. After maturing by heating at 80° C. for another 3 hours, the product was cooled down and the pH adjusted to 7 to 8 with potassium hydroxide.

With regard to the obtained silicone modified acrylic resin fine-particles, as with Synthesis example 2, a peak of $^{29}$Si—NMR was compared with a peak of $^{29}$Si—NMR of the raw material, and because the peak by the hydrolyzable silyl group disappeared, it was confirmed that there was no reactive silyl group.

The volume average particle diameter (D50%) of the obtained silicone modified acrylic resin fine-particles not containing a reactive silyl group measured with the particle diameter analyzer (Microtrac UPA manufactured by NIKKISO Co., Ltd.) was 10 nm. Further, the minimum film forming temperature (MFT) measured by the film formation temperature meter was 0° C.

Example 1

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Carbon black pigment dispersion in Preparation example 1 | 10.0% by mass (as solid) |
| Silicone modified acrylic resin fine-particles in Synthesis example 2 | 5.0% by mass (as solid) |
| Diethylene glycol | 18.0% by mass |
| Glycerin | 6.0% by mass |

| <Ink composition> | |
|---|---|
| 2-pyrrolidone | 2.0% by mass |
| Surfactant (Softanol EP7025 manufactured by Nippon Shokubai Co., Ltd.) | 1.0% by mass |
| 2,2,4-trimethyl-1,3-pentanediol | 2.0% by mass |
| Deionized water | 56.0% by mass |

Example 2

—Production of Yellow Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Yellow pigment dispersion in Preparation example 2 | 6.0% by mass (as solid) |
| Silicone modified acrylic resin fine-particles in Synthesis example 2 | 5.0% by mass (as solid) |
| 1,5-pentanediol | 20.0% by mass |
| Glycerin | 5.0% by mass |
| Surfactant (Softanol EP7025 manufactured by Nippon Shokubai Co., Ltd.) | 1.0% by mass |
| 2-ethyl-1,3-hexanediol | 2.0% by mass |
| Deionized water | 61.0% by mass |

Example 3

—Production of Magenta Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Magenta pigment dispersion in Preparation example 3 | 7.0% by mass (as solid) |
| Silicone modified acrylic resin fine-particles in Synthesis example 2 | 3.0% by mass (as solid) |
| 1,3-butanediol | 18.0% by mass |
| Glycerin | 6.0% by mass |
| N-methyl-2-pyrrolidone | 3.0% by mass |
| Surfactant (Softanol EP7025 manufactured by Nippon Shokubai Co., Ltd.) | 1.0% by mass |
| 2,2,4-trimethyl-1,3-pentanediol | 2.0% by mass |
| Deionized water | 60.0% by mass |

Example 4

—Production of Cyan Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Cyan pigment dispersion in Preparation example 4 | 6.0% by mass (as solid) |
| Silicone modified acrylic resin fine-particles in Synthesis example 2 | 5.0% by mass (as solid) |
| 1,5-pentanediol | 20.0% by mass |
| Glycerin | 5.0% by mass |
| Surfactant (Softanol EP7025 manufactured by Nippon Shokubai Co., Ltd.) | 1.0% by mass |
| 2-ethyl-1,3-hexanediol | 2.0% by mass |
| Deionized water | 61.0% by mass |

Example 5

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Carbon Black pigment polymer dispersion in Preparation example 8 | 10.0% by mass (as solid) |
| Silicone modified acrylic resin fine-particles in Synthesis example 2 | 2.0% by mass (as solid) |
| 1,6-hexanediol | 15.0% by mass |
| Glycerin | 7.0% by mass |
| 2-pyrrolidone | 2.0% by mass |
| Surfactant (Softanol EP7025 manufactured by Nippon Shokubai Co., Ltd.) | 1.0% by mass |
| 2,2,4-trimethyl-1,3-pentanediol | 2.0% by mass |
| Deionized water | 61.0% by mass |

Example 6

—Production of Cyan Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Cyan pigment dispersion in Preparation example 5 | 7.0% by mass (as solid) |
| Silicone modified acrylic resin fine-particles in Synthesis example 2 | 3.0% by mass (as solid) |
| 1,5-pentanediol | 16.0% by mass |
| Glycerin | 6.0% by mass |
| N-methyl-2-pyrrolidone | 5.0% by mass |
| Surfactant (Softanol EP7025 manufactured by Nippon Shokubai Co., Ltd.) | 2.0% by mass |
| 2,2,4-trimethyl-1,3-pentanediol | 2.0% by mass |
| Deionized water | 59.0% by mass |

Example 7

—Production of Magenta Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Magenta pigment polymer dispersion in Preparation example 6 | 6.0% by mass (as solid) |
| Silicone modified acrylic resin fine-particles in Synthesis example 2 | 3.0% by mass (as solid) |
| 1,3-butanediol | 20.0% by mass |
| Glycerin | 5.0% by mass |
| Surfactant (Softanol EP7025 manufactured by Nippon Shokubai Co., Ltd.) | 2.0% by mass |
| 2-ethyl-1,3-hexanediol | 3.0% by mass |
| Deionized water | 61.0% by mass |

Example 8

—Production of Yellow Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Yellow pigment polymer dispersion in Preparation example 7 | 5.0% by mass (as solid) |
| Silicone modified acrylic resin fine-particles in Synthesis example 2 | 2.0% by mass (as solid) |
| 1,5-pentanediol | 20.0% by mass |
| Glycerin | 6.0% by mass |
| N-methyl-2-pyrrolidone | 3.0% by mass |
| Surfactant (Softanol EP7025 manufactured by Nippon Shokubai Co., Ltd.) | 2.0% by mass |
| 2,2,4-trimethyl-1,3-pentanediol | 2.0% by mass |
| Deionized water | 60.0% by mass |

Example 9

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Carbon black pigment dispersion in Preparation example 1 | 10.0% by mass (as solid) |
| Silicone modified acrylic resin fine-particles in Synthesis example 2 | 10.0% by mass (as solid) |
| Diethylene glycol | 16.0% by mass |
| Glycerin | 8.0% by mass |
| 2-pyrrolidone | 2.0% by mass |
| Surfactant (Softanol EP7025 manufactured by Nippon Shokubai Co., Ltd.) | 2.0% by mass |
| 2,2,4-trimethyl-1,3-pentanediol | 1.0% by mass |
| Deionized water | 51.0% by mass |

Example 10

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Carbon black pigment dispersion in Preparation example 1 | 8.0% by mass (as solid) |
| Silicone modified acrylic resin fine-particles in Synthesis example 2 | 4.0% by mass (as solid) |
| 3-methyl-1,3-butanediol | 16.0% by mass |
| Glycerin | 8.0% by mass |
| Surfactant (Softanol EP7025 manufactured by Nippon Shokubai Co., Ltd.) | 2.0% by mass |
| 2-ethyl-1,3-hexanediol | 1.0% by mass |
| 1-amino-2,3-propanediol | 0.5% by mass |
| Deionized water | 60.5% by mass |

Example 11

—Production of Yellow Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Yellow pigment dispersion in Preparation example 2 | 6.0% by mass (as solid) |
| Silicone modified acrylic resin fine-particles in Synthesis example 2 | 1.0% by mass (as solid) |
| 1,6-hexanediol | 21.0% by mass |
| 2-pyrrolidone | 2.0% by mass |
| Glycerin | 7.0% by mass |
| Surfactant (Softanol EP7025 manufactured by Nippon Shokubai Co., Ltd.) | 1.0% by mass |
| 2-ethyl-1,3-hexanediol | 2.0% by mass |
| Deionized water | 60.0% by mass |

Example 12

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

<Ink composition>

| | |
|---|---|
| Carbon black pigment dispersion in Preparation example 1 | 13.0% by mass (as solid) |
| Silicone modified acrylic resin fine-particles in Synthesis example 2 | 8.0% by mass (as solid) |
| Diethylene glycol | 14.0% by mass |
| Glycerin | 7.0% by mass |
| Surfactant (Softanol EP7025 manufactured by Nippon Shokubai Co., Ltd.) | 1.0% by mass |
| 2-ethyl-1,3-hexanediol | 2.0% by mass |
| Deionized water | 55.0% by mass |

Example 13

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

<Ink composition>

| | |
|---|---|
| Carbon black pigment dispersion in Preparation example 1 | 10.0% by mass (as solid) |
| Silicone modified acrylic resin fine-particles in Synthesis example 2 | 0.5% by mass (as solid) |
| 3-methyl-1,3-butanediol | 16.0% by mass |
| Glycerin | 5.0% by mass |
| Surfactant (Softanol EP7025 manufactured by Nippon Shokubai Co., Ltd.) | 1.0% by mass |
| 2-ethyl-1,3-hexanediol | 2.0% by mass |
| Deionized water | 65.5% by mass |

Example 14

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

<Ink composition>

| | |
|---|---|
| Carbon black pigment dispersion in Preparation example 1 | 10.0% by mass (as solid) |
| Silicone modified acrylic resin fine-particles in Synthesis example 3 | 8.0% by mass (as solid) |
| 1,3-butanediol | 18.0% by mass |
| Glycerin | 6.0% by mass |
| Surfactant (Softanol EP7025 manufactured by Nippon Shokubai Co., Ltd.) | 1.0% by mass |
| 2,2,4-trimethyl-1,3-pentanediol | 2.0% by mass |
| Deionized water | 55.0% by mass |

Example 15

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

<Ink composition>

| | |
|---|---|
| Carbon black pigment dispersion in Preparation example 1 | 10.0% by mass (as solid) |
| Silicone modified acrylic resin fine-particles in Synthesis example 5 | 8.0% by mass (as solid) |
| 1,3-butanediol | 18.0% by mass |
| Glycerin | 6.0% by mass |
| Surfactant (Softanol EP7025 manufactured by Nippon Shokubai Co., Ltd.) | 1.0% by mass |
| 2,2,4-trimethyl-1,3-pentanediol | 2.0% by mass |
| Deionized water | 55.0% by mass |

Example 16

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

<Ink composition>

| | |
|---|---|
| Carbon black pigment dispersion in Preparation example 1 | 10.0% by mass (as solid) |
| Silicone modified acrylic resin fine-particles in Synthesis example 6 | 5.0% by mass (as solid) |
| 1,6-hexanediol | 18.0% by mass |
| Glycerin | 6.0% by mass |
| 2-pyrrolidone | 2.0% by mass |
| Surfactant (Softanol EP7025 manufactured by Nippon Shokubai Co., Ltd.) | 1.0% by mass |
| 2,2,4-trimethyl-1,3-pentanediol | 2.0% by mass |
| Deionized water | 56.0% by mass |

Example 17

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

<Ink composition>

| | |
|---|---|
| Carbon black pigment dispersion in Preparation example 1 | 10.0% by mass (as solid) |
| Silicone modified acrylic resin fine-particles in Synthesis example 7 | 5.0% by mass (as solid) |
| 1,6-hexanediol | 18.0% by mass |
| Glycerin | 6.0% by mass |
| 2-pyrrolidone | 2.0% by mass |
| Surfactant (Softanol EP7025 manufactured by Nippon Shokubai Co., Ltd.) | 1.0% by mass |
| 2,2,4-trimethyl-1,3-pentanediol | 2.0% by mass |
| Deionized water | 56.0% by mass |

Example 18

—Production of Cyan Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

<Ink composition>

| | |
|---|---|
| Cyan pigment polymer dispersion in Preparation example 4 | 6.0% by mass (as solid) |
| Aquabrid Asi 91 (manufactured by Daicel Chemical Industries, Ltd., silicone modified acrylic resin: MFT = 25° C.) | 4.0% by mass (as solid) |
| 1,6-hexanediol | 20.0% by mass |
| Glycerin | 5.0% by mass |
| Surfactant (Softanol EP7025 manufactured by Nippon Shokubai Co., Ltd.) | 1.0% by mass. |
| 2-ethyl-1,3-hexanediol | 2.0% by mass |
| Deionized water | 62.0% by mass |

Example 19

—Production of Cyan Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

<Ink composition>

| | |
|---|---|
| Cyan pigment polymer dispersion in Preparation example 4 | 6.0% by mass (as solid) |
| Silicone modified acrylic resin fine-particles in Synthesis example 2 | 4.0% by mass (as solid) |
| 1,3-butanediol | 19.5% by mass |
| Glycerin | 6.5% by mass |
| Fluorochemical surfactant having the following Structural Formula (1) | 1.0% by mass |
| 2-ethyl-1,3-hexanediol | 2.0% by mass |
| Deionized water | 61.0% by mass |
| $CF_3CF_2(CF_2CF_2)_m$—$CH_2CH_2O(CH_2CH_2O)_nH$ | Structural Formula (1) | in the Structural Formula (1), 'm' is 2, and 'n' is 10.

Example 20

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

<Ink composition>

| | |
|---|---|
| Carbon black pigment dispersion in Preparation example 1 | 8.0% by mass (as solid) |
| Silicone modified acrylic resin fine-particles in Synthesis example 2 | 6.0% by mass (as solid) |
| 1,3-butanediol | 18.0% by mass |
| Glycerin | 6.0% by mass |
| Fluorochemical surfactant having the following Structural Formula (2) | 1.0% by mass |
| 2-ethyl-1,3-hexanediol | 2.0% by mass |
| Deionized water | 59.0% by mass |

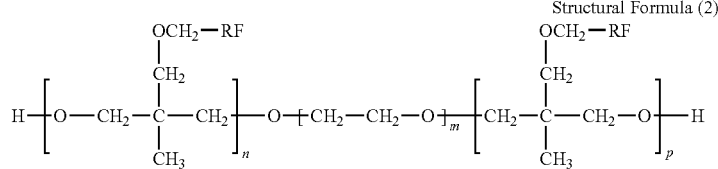

Structural Formula (2)

in the Structural Formula (2), 'Rf' is $CF_2CF_3$, 'm' is 21, 'n' is 4, and 'p' is 4.

Example 21

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

<Ink composition>

| | |
|---|---|
| Carbon black pigment dispersion in Preparation example 8 | 9.0% by mass (as solid) |

-continued

| <Ink composition> | |
|---|---|
| Silicone modified acrylic resin fine-particles in Synthesis example 2 | 2.0% by mass (as solid) |
| 1,6-pentanediol | 16.0% by mass |
| 2-pyrrolidone | 2.0% by mass |
| Glycerin | 7.0% by mass |
| Fluorochemical surfactant having the following Structural Formula (3) | 1.0% by mass |
| 2,2,4-trimethyl-1,3-pentanediol | 2.0% by mass |
| Deionized water | 61.0% by mass |

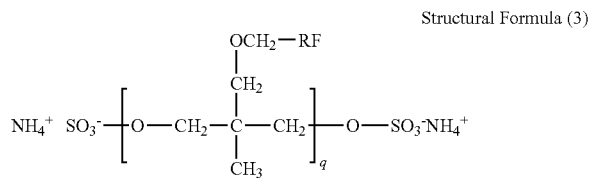

Structural Formula (3)

in the Structural Formula (3), 'Rf' is $CF_2CF_3$, and 'q' is 6.

Comparative Example 1

—Production of Magenta Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Magenta pigment dispersion in Preparation example 3 | 6.0% by mass (as solid) |
| 1,6-hexanediol | 20.0% by mass |
| Glycerin | 5.0% by mass |
| Surfactant (Softanol EP7025 manufactured by Nippon Shokubai Co., Ltd.) | 1.0% by mass |
| 2-ethyl-1,3-hexanediol | 2.0% by mass |
| Deionized water | 60.0% by mass |

Comparative Example 2

—Production of Cyan Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Cyan pigment dispersion in Preparation example 4 | 6.0% by mass (as solid) |
| Silicone modified acrylic resin fine-particles in Synthesis example 4 | 3.0% by mass (as solid) |
| 1,5-pentanediol | 20.0% by mass |
| Glycerin | 6.0% by mass |
| Surfactant (Softanol EP7025 manufactured by Nippon Shokubai Co., Ltd.) | 1.0% by mass |
| 2,2,4-trimethyl-1,3-pentanediol | 2.0% by mass |
| Deionized water | 62.0% by mass |

Comparative Example 3

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Carbon Black pigment dispersion in Preparation example 1 | 10.0% by mass (as solid) |
| Aquabrid 4720 (manufactured by Daicel Chemical Industries, Ltd., acrylic resin: MFT = 50° C.) | 4.0% by mass (as solid) |
| 1,3-butanediol | 18.0% by mass |
| Glycerin | 6.0% by mass |
| Surfactant (Softanol EP7025 manufactured by Nippon Shokubai Co., Ltd.) | 1.0% by mass |
| 2,2,4-trimethyl-1,3-pentanediol | 2.0% by mass |
| Deionized water | 59.0% by mass |

Comparative Example 4

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Carbon black pigment dispersion in Preparation example 1 | 10.0% by mass (as solid) |
| PESRESIN A210 (manufactured by Takamatsu Oil & Fat Co., Ltd., polyester resin, MFT = 20° C. or lower) | 4.0% by mass (as solid) |
| 1,3-butanediol | 18.0% by mass |
| Glycerin | 6.0% by mass |
| Surfactant (Softanol EP7025 manufactured by Nippon Shokubai Co., Ltd.) | 1.0% by mass |
| 2,2,4-trimethyl-1,3-pentanediol | 2.0% by mass |
| Deionized water | 59.0% by mass |

Comparative Example 5

—Production of Cyan Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Cyan pigment dispersion in Preparation example 4 | 6.0% by mass (as solid) |
| Silicone modified acrylic resin fine-particles in Synthesis example 2 | 3.0% by mass (as solid) |
| 1,5-petanediol | 20.0% by mass |
| Glycerin | 6.0% by mass |

-continued

| <Ink composition> | |
|---|---|
| Surfactant (Softanol EP7025 manufactured by Nippon Shokubai Co., Ltd.) | 1.0% by mass |
| Deionized water | 64.0% by mass |

Comparative Example 6

—Production of Black Pigment Ink—

Ink composition with the following formula was prepared, and pH was adjusted to 9 with 10% by mass of lithium hydroxide solution. Subsequently, the ink composition was filtered with a membrane filter with 0.8 μm of average bore diameter, thereby produced the ink.

| <Ink composition> | |
|---|---|
| Carbon black pigment dispersion in Preparation example 1 | 8.0% by mass (as solid) |
| Silicone modified acrylic resin fine-particles in Synthesis example 2 | 5.0% by mass (as solid) |
| 1,3-butanediol | 18.0% by mass |
| Glycerin | 6.0% by mass |
| Surfactant (Softanol EP7025 manufactured by Nippon Shokubai Co., Ltd.) | 1.0% by mass |
| 3,3-dimethyl-1,2-butanediol | 2.0% by mass |
| Deionized water | 60.0% by mass |

Various evaluations were conducted with respect to the inks of Examples 1 to 21 and Comparative Examples 1 to 6 as follows. The results are shown in Table 1 to Table 3.

<Ink Viscosity>

The ink viscosity in each recording ink was measured at 25° C. using an R type viscometer (manufactured by Toki Sangyo Co., Ltd.).

<Content of Silicon (Si) in Recording Ink>

The content of silicon (Si) in each recording ink was measured using a high-frequency induction plasma emission spectrometer.

<Volume Average Particle Diameter of Ink>

The volume average particle diameter (D50%) in each recording ink was measured using a particle diameter analyzer (Microtrac UPA manufactured by NIKKISO Co., Ltd.).

<Visibility of Image>

Figure 3:
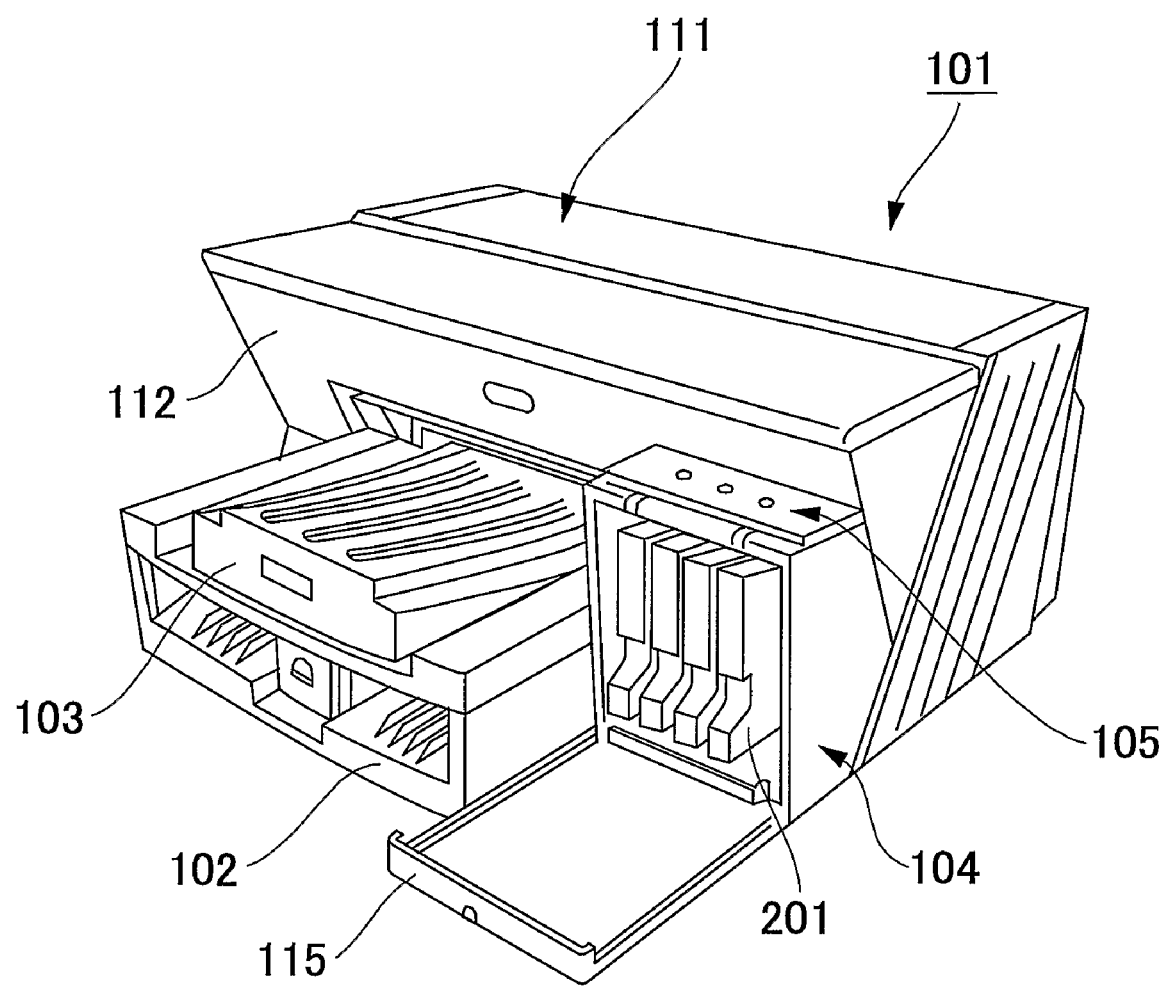
FIG. 3 is an exemplary perspective diagram in the situation where a cover of an ink cartridge loading section in the inkjet recording apparatus is opened.

The ink in Examples 1 to 21 and Comparative examples 1 to 6 was filled in the inkjet printer shown in FIG. 3 to FIG. 5, respectively, and printing was performed on Type 6200 paper (manufactured by NBS Ricoh Co., Ltd.) with 600 dpi of resolution. After the printed images dried, two colors were placed one upon another and boundary blotting (bleed) and image blotting (feathering) were visually observed, and the evaluation was conducted according to the following criteria. Further, the image density was measured using a reflective spectrophotometric colorimetry densitometer (manufacture by X-Rite, K.K.).

[Evaluation Criteria]
A: No blotting occurs, and the image is clear.
B: Hair-like blotting has occurred.
C: Blotting has occurred, so the outline of letters is not clear.

<Fixing Properties>

The ink in Examples 1 to 21 and Comparative examples 1 to 6 was filled in the inkjet printer shown in FIG. 3 to FIG. 5, respectively, and printing was performed on Type 6200 paper (manufactured by NBS Ricoh Co., Ltd.) with 600 dpi of resolution. After the printed images dried, the printed portion was rubbed 10 times with cotton cloth, and the state of transfer of the pigment to the cotton cloth was visually observed and evaluated according to the following criteria:

[Evaluation Criteria]
A: No transfer of the pigment to the cotton cloth was observed.
B: Hardly any transfer of the pigment to the cotton cloth was observed.
C: Slight transfer of the pigment is observed.
D: The pigment is obviously transferred.

<Marker Resistance>

The ink in Examples 1 to 21 and Comparative examples 1 to 6 was filled in the inkjet printer shown in FIG. 3 to FIG. 5, respectively, and printing was performed to Type 6200 paper (manufactured by NBS Ricoh Co., Ltd.) with 600 dpi of resolution. After the printed images dried, the printed portion was traced with a fluorescent marker (PROPUS2 manufactured by Mitsubishipencil Co., Ltd.), and the state of smearing occurring due to the removal of the pigment was visually observed and evaluated according to the following criteria:

[Evaluation Criteria]
A: No smear due to discolorment is observed.
B: Hardly any smear due to discolorment is observed.
C: A slight smear is observed.
D: A smear spreads along the marker.

<Ink Discharge Properties>

The ink in Examples 1 to 21 and Comparative examples 1 to 6 was filled in the inkjet printer shown in FIG. 3 to FIG. 5, respectively, and continuous printing on 200 sheets was performed to Type 6200 paper (manufactured by NBS Ricoh Co., Ltd.) with 600 dpi of resolution, and the discharge disorder and the state of no discharge were evaluated according to the following criteria:

[Evaluation Criteria]
A: No discharge disorder or no discharge is observed.
B: Hardly any discharge disorder or hardly any discharge is observed.
C: A discharge disorder and no discharge are observed in 3 nozzles or less.
D: A discharge disorder and no discharge are observed in 4 nozzles or more.

<Ink Storage Properties>

The ink in Examples 1 to 21 and Comparative examples 1 to 6 was filled in cartridge, respectively, and were stored at 50° C. for 3 weeks. Whether or not the viscosity increase or cohesion occurred was evaluated according to the following criteria.

[Evaluation Criteria]
A: No viscosity increase or cohesion is observed.
B: Hardly any viscosity increase or cohesion is observed.
C: A slight viscosity increase is observed.
D: A viscosity increase and cohesion are remarkable.

<Double Side Printing Properties>

The ink in Examples 1 to 21 and Comparative examples 1 to 6 was filled in the inkjet printer shown in FIG. 3 to FIG. 5, respectively, and printing was performed to Type 6200 paper (manufactured by NBS Ricoh Co., Ltd.) with 600 dpi of resolution. Immediately after the printing was completed on one side, the paper was reversed via an exclusive unit, and printing was performed on another side. This process to 100 sheets was continuously performed, and sheet smear generating due to rubbing the ink, which was not penetrated when reversing the sheet, and the conveyance after reversing were evaluated according to the following criteria:

[Evaluation Criteria]
A: No ink smear generating due to rubbing upon reversing is observed.
B: The number of sheets where the ink is stuck due to rubbing upon reversing is 10 or less.
C: The number of sheets where the ink is stuck due to rubbing upon reversing is 11 or more.

TABLE 1

| No. | Example 1 | 2 | 3 | 4 | 5 | 6 | 7 | 8 | 9 | 10 |
|---|---|---|---|---|---|---|---|---|---|---|
| Solid content (% by msss) | 15 | 12 | 10 | 8 | 12 | 10 | 9 | 7 | 20 | 14 |
| Content of silicon (ppm) | 180 | 150 | 98 | 65 | 141 | 90 | 88 | 72 | 390 | 138 |
| Viscosity (mPa·s) | 8.1 | 8.42 | 7.65 | 7.33 | 8.39 | 8.6 | 7.41 | 8.21 | 11.76 | 8.25 |
| Volume average particle diameter (nm) | 103.5 | 112.3 | 146.2 | 78.6 | 108.1 | 116.5 | 152.9 | 80.9 | 118.6 | 110.4 |
| Image density | 1.36 | 1.05 | 0.95 | 0.82 | 1.29 | 1.07 | 0.93 | 0.84 | 1.38 | 1.36 |
| Feathering | A | A | A | A | A | A | A | A | A | A |
| Bleed | A | A | A | A | A | A | A | A | A | A |
| Ink storage properties | B | B | B | B | B | B | B | B | B | A |
| Ink Discharge properties | B | B | B | B | B | B | B | B | B | A |
| Fixing preperties | B | A | B | A | A | A | A | A | A | B |
| Marker resistance | B | A | B | A | A | A | A | A | A | B |
| Double side printing properties | A | A | A | A | A | A | A | A | A | A |

In Example 10, since 1-amino-2,3-propanediol was added, it is confirmed that the ink storage properties and the ink discharge properties are more excellent in comparison with other examples.

TABLE 2

| No. | Example 11 | 12 | 13 | 14 | 15 | Comparative example 1 | 2 | 3 | 4 | 5 |
|---|---|---|---|---|---|---|---|---|---|---|
| Solid content (% by msss) | 4 | 21 | 10.5 | 18 | 18 | 6 | 9 | 12 | 12 | 9 |
| Content of silicon (ppm) | 32 | 256 | 18 | 410 | 185 | 0 | 90 | 0 | 0 | 82 |
| Viscosity (mPa·s) | 7.65 | 9.12 | 6.55 | 9.86 | 9.11 | 7.21 | 7.92 | 8.06 | 8.15 | 7.83 |
| Volume average particle diameter (nm) | 85.6 | 118.9 | 101.6 | 105.5 | 180 | 143.7 | 113.2 | 111.4 | 108 | 116.8 |
| Image density | 0.64 | 1.4 | 1.26 | 1.26 | 1.21 | 0.89 | 0.98 | 1.21 | 1.25 | 1.01 |
| Feathering | B | A | B | A | A | B | B | B | B | B |
| Bleed | B | A | B | A | A | B | B | B | B | B |
| Ink storage properties | B | C | B | C | C | B | D | C | C | B |
| Ink Discharge properties | B | C | B | C | C | B | D | C | C | C |
| Fixing preperties | C | A | C | B | B | D | C | C | C | C |
| Marker resistance | C | A | C | B | B | D | C | D | D | C |
| Double side printing properties | A | A | A | A | A | A | A | A | A | C |

TABLE 3

|  | Example | | | | | | Comp. Ex. |
| --- | --- | --- | --- | --- | --- | --- | --- |
| No. | 16 | 17 | 18 | 19 | 20 | 21 | 6 |
| Solid content (% by msss) | 15 | 15 | 10 | 10 | 14 | 11 | 13 |
| Content of silicon (ppm) | 173 | 170 | 51 | 121 | 176 | 62 | 152 |
| Viscosity (mPa · s) | 15.6 | 18.0 | 8.6 | 8.48 | 8.53 | 8.41 | 7.40 |
| Volume Average particle diameter (nm) | 98.2 | 94.2 | 121.0 | 115.1 | 120.4 | 112.3 | 115.6 |
| Image density | 1.19 | 1.13 | 0.90 | 0.96 | 1.4 | 1.38 | 1.25 |
| Feathering | A | A | A | A | A | A | B |
| Bleed | A | A | A | A | A | A | B |
| Ink storage properties | B | C | B | B | B | B | B |
| Ink Discharge properties | C | C | C | B | B | B | B |
| Fixing preperties | B | C | C | B | B | B | C |
| Marker resistance | B | C | C | B | B | B | D |
| Double side printing properties | A | A | B | A | A | A | C |

In Example 17, since the silicone modified acrylic resin fine-particles not containing the reactive silyl group with 10 nm of average particle diameter in Synthesis example 7 was added, a large amount of surfactant is required upon synthesis, so a large amount of surfactant will be contained in the formed ink coating. As a result, sufficient film strength cannot be obtained, and the fixing properties and marker resistance becomes inferior in comparison to those of other examples.

INDUSTRIAL APPLICABILITY

The recording ink of the present invention is with excellent discharge stability and storage stability, rapidly penetrates into a recording medium and forms a coating, and will never generate smearing upon high-speed printing or double-sided printing, and excels in marker resistance, and enables high quality image recording with less bleeding, and is preferably used for an ink cartridge, ink record, and an inkjet recording apparatus, and an inkjet recording method.

The inkjet recording apparatus and inkjet recording method of the present invention are applicable to various recording in an inkjet recording system. For example, the inkjet recording apparatus and inkjet recording method of the present invention can be particularly preferably applied to inkjet recording printers, facsimiles, copy machines, and printer/fax/copy complex machines.

The invention claimed is:

1. A recording ink comprising:
   water,
   a colorant,
   a resin fine-particle,
   a water-soluble organic solvent, and
   a penetrant,
   wherein the penetrant is a diol compound having 7 to 11 carbon atoms and the resin fine-particle is a silicone modified acrylic resin not containing a hydrolyzable silyl group and wherein the silicone modified acrylic resin not containing a hydrolyzable silyl group is obtained by polymerizing at least one acrylic monomer with at least one silane comprising at least one hydrolyzable group, and wherein no hydrolyzable silyl group remains as a result of said polymerizing.

2. The recording ink according to claim 1, wherein a volume average particle diameter of the resin fine-particle is 10 nm to 300 nm.

3. The recording ink according to claim 1, wherein the silicon quantity originated from the silicone modified acrylic resin in the recording ink is 50 ppm to 400 ppm.

4. The recording ink according to claim 1, wherein the minimum film forming temperature (MFT) of the resin fine-particle is 20° C. or lower.

5. The recording ink according to claim 1, wherein the water-soluble organic solvent is at least one selected from glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone and N-hydroxyethyl-2-pyrrolidone.

6. The recording ink according to claim 1, wherein the colorant is at least one of a pigment, a dye and a colored fine-particle.

7. The recording ink according to claim 6, wherein the colorant is at least one pigment, and the pigment comprises at least one hydrophilic group on the surface, and is at least one of water dispersible and water soluble in the absence of a dispersant.

8. The recording ink according to claim 6, wherein 0.05 parts by mass to 1.2 parts by mass of the silicone modified acrylic resin fine-particles not containing a hydrolyzable silyl group is added relative to 1 part by mass of the pigment.

9. The recording ink according to claim 1, further comprising a nonionic surfactant wherein the nonionic surfactant is at least one selected from an acetylene glycol surfactant, polyoxyethylene alkyl ether, polyoxyethylene alkylphenyl ether, polyoxyethylene alky ester and polyoxyethylene sorbitan fatty acid ester.

10. The recording ink according to claim 1, further comprising a fluorochemical surfactant, wherein the fluorochemical surfactant is at least one selected from the following Structural Formulae (1), (2) and (3),

$CF_3CF_2(CF_2CF_2)_m$—$CH_2CH_2O(CH_2CH_2O)_n$H Structural Formula (1)

in the Structural Formula (1), 'm' is an integer of 0 to 10, and 'n' is an integer of 1 to 40, Structural Formula (2)

$$\text{HO}-\!\!\left[\text{O}-\text{CH}_2-\overset{\overset{\displaystyle\text{OCH}_2-\text{RF}}{|}}{\underset{\underset{\displaystyle\text{CH}_3}{|}}{\text{C}}}-\text{CH}_2\right]_n\!\!-\!\!\left[\text{O}-\text{CH}_2-\text{CH}_2-\text{O}\right]_m\!\!-\!\!\left[\text{CH}_2-\overset{\overset{\displaystyle\text{OCH}_2-\text{RF}}{|}}{\underset{\underset{\displaystyle\text{CH}_3}{|}}{\text{C}}}-\text{CH}_2-\text{O}\right]_p\!\!-\text{H}$$

in the Structural Formula (2), 'RF' is $CF_3$ or $CF_2CF_3$, 'm' is an integer of 6 to 25, 'n' is an integer of 1 to 4, and 'p' is an integer of 1 to 4, Structural Formula (3)

$$\text{NH}_4^+\text{SO}_3^-\!-\!\!\left[\text{O}-\text{CH}_2-\overset{\overset{\displaystyle\text{OCH}_2-\text{RF}}{|}}{\underset{\underset{\displaystyle\text{CH}_3}{|}}{\text{C}}}-\text{CH}_2\right]_q\!\!-\text{O}-\text{SO}_3^-\text{NH}_4^+$$

in the Structural Formula (3), 'RF' is $CF_3$ or $CF_2CF_3$, and 'q' is an integer of 1 to 6.

11. The recording ink according to claim 1, further comprising an anionic surfactant, wherein the anionic surfactant is at least one selected from polyoxyethylene alkyl ether acetate and dialkyl sulfosuccinate salt.

12. The recording ink according to claim 1, further comprising an aminopropane diol compound.

13. The recording ink according to claim 1, wherein the viscosity of the recording ink at 25° C. is 7 mPa·sec. to 20 mPa·sec.

14. The recording ink according to claim 1, wherein the solid content of the recording ink is 6% by mass to 20% by mass.

15. The recording ink according to claim 1, wherein the recording ink is at least one selected from cyan ink, magenta ink, yellow ink and black ink.

* * * * *